(12) United States Patent
Sato

(10) Patent No.: US 8,339,622 B2
(45) Date of Patent: Dec. 25, 2012

(54) IMAGE PROCESSING APPARATUS AND INTEGRATED DOCUMENT GENERATING METHOD

(75) Inventor: Yukimasa Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 918 days.

(21) Appl. No.: 12/200,502

(22) Filed: Aug. 28, 2008

(65) Prior Publication Data

US 2009/0059261 A1 Mar. 5, 2009

(30) Foreign Application Priority Data

Aug. 30, 2007 (JP) ................................ 2007-224093

(51) Int. Cl.
*G06F 15/00* (2006.01)
*G06F 17/00* (2006.01)
(52) U.S. Cl. ...................................... 358/1.13; 235/375
(58) Field of Classification Search ................ 358/1.13, 358/1.15, 1.14, 1.16, 1.18, 1.8, 1.6, 3.27, 358/402, 408; 715/207, 234; 382/173, 186, 382/313, 312; 235/487, 462.49
See application file for complete search history.

(56) References Cited

U.S. PATENT DOCUMENTS

2006/0007481 A1 * 1/2006 Kato et al. ................... 358/1.15

FOREIGN PATENT DOCUMENTS

| JP | 01-106263 A | 4/1989 |
|----|-------------|--------|
| JP | 2005-208872 A | 8/2005 |
| JP | 2006-23942 | 1/2006 |
| JP | 2006-023942 A | 1/2006 |

* cited by examiner

*Primary Examiner* — Saeid Ebrahimi Dehkordy
(74) *Attorney, Agent, or Firm* — Canon U.S.A., Inc. IP Division

(57) ABSTRACT

An image processing apparatus includes a vectorizing unit configured to convert bitmap image data into vectorized data; an integrated document generating unit configured to generate an integrated document which includes the vectorized data and metadata; an accompanying information extraction unit configured to extract one or more of accompanying information relating to the bitmap image data from the bitmap image data; a selection unit configured to select accompanying information meeting conditions which have been defined beforehand out of one or more of accompanying information extracted by the accompanying information extraction unit; and a registration unit configured to register the accompanying information selected by the selection unit as the metadata of the integrated document.

12 Claims, 26 Drawing Sheets

FIG. 6
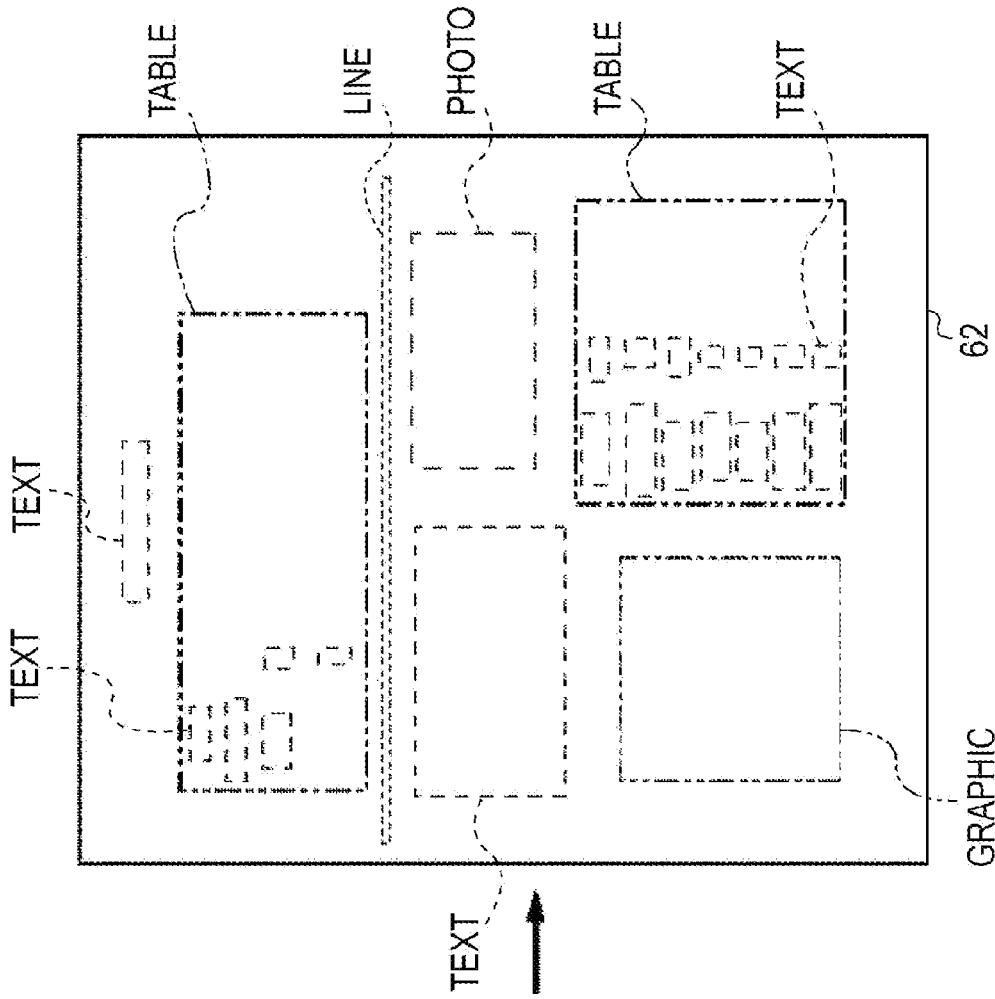
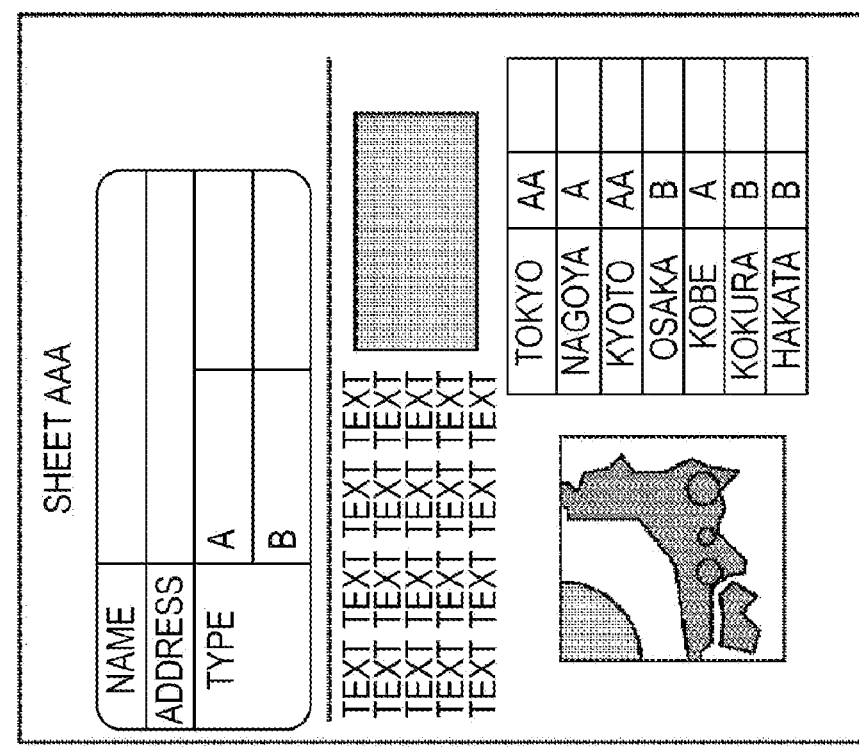

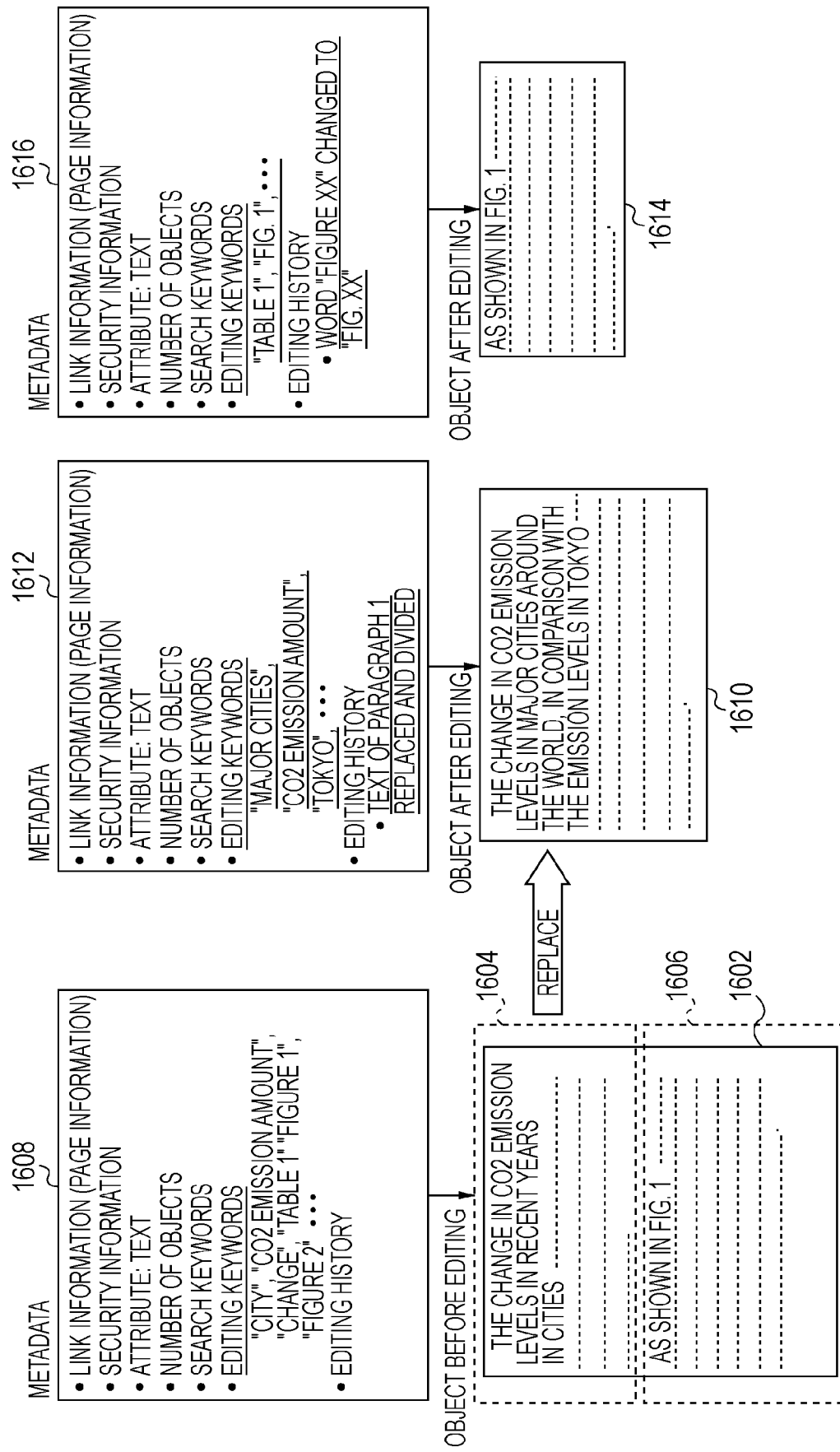

| USER ID | UID0001 | UID0002 |
|---|---|---|
| EDITING HISTORY 1 | | |
| CONTENT | CHANGE TEXT OF PARAGRAPH 0002 | ... |
| EDITING KEYWORDS | GLOBAL WARMING | ... |
| KEYWORDS GENERATED AFTER EDITING | ENVIRONMENT | ... |
| EDITING HISTORY 2 | | |
| CONTENT | CHANGED "FIGURE" TO "FIG." | ... |
| EDITING KEYWORDS | PRECIPITATION | ... |
| KEYWORDS GENERATED AFTER EDITING | PRECIPITATION | ... |

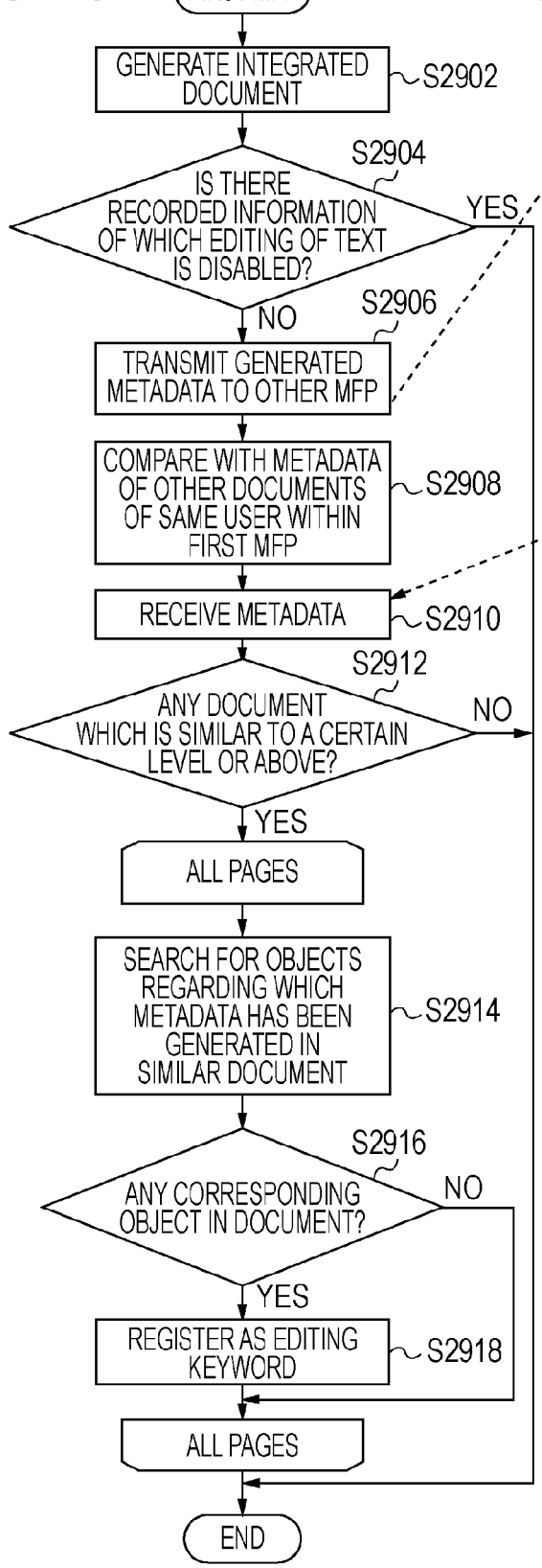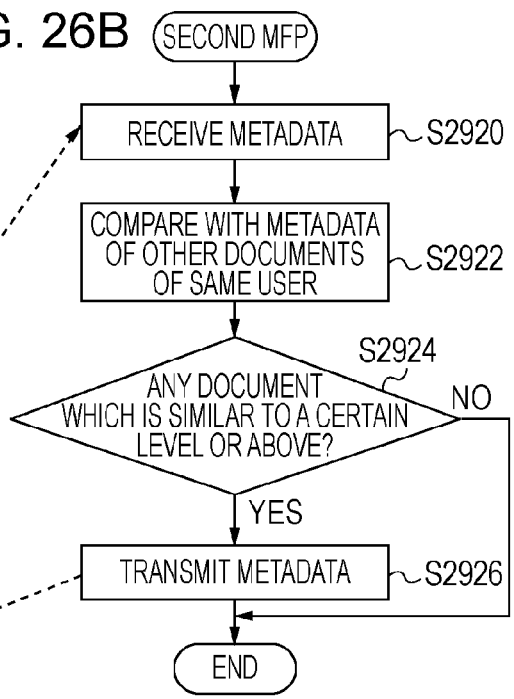

IMAGE PROCESSING APPARATUS AND INTEGRATED DOCUMENT GENERATING METHOD

BACKGROUND OF THE INVENTION

1. Field of the Invention

The present invention relates to an image processing apparatus and an integrated document generating method.

2. Description of the Related Art

Heretofore, with an image processing apparatus such as an MFP (Multi Function Peripheral), an image stored in a storage device of the apparatus has been image data in a bitmap format. As image data stored in the storage device increases, searching for a desired file from menu information such as file names or thumbnails becomes difficult.

If a user inputs a keyword included in the desired file from a user interface, and if only files matching such keyword in a search are displayed as a menu, convenience for the user increases significantly, but the image data within the MFP storage device has no keyword to be used for such a search.

On the other hand, technology for vectorizing a bitmap image input with an image input device has been developed (e.g. Japanese Patent Laid-Open No. 2006-23942). Data thus obtained as a result of vectorizing a bitmap image is called vector data.

However, since the vector data generated by vectorizing is data for performing drawing, this data does not necessarily include keywords which the user wishes to search such as text string information or image information within a document. Therefore, secondary information which can be obtained from the bitmap image data is generated as appended information which is not subjected to print processing, and is appended to vector data. Such secondary information is called metadata. The generated metadata is appended to a collection of normal jobs, pages, and picture objects (e.g. a collection summarized in drawing units of Text/Graphics/Images and so forth). Image data can be searched using such metadata.

However, in the case of generating metadata from vector data, if all of the secondary information obtained from the vector data is registered as metadata, the data amount of metadata becomes enormous. The data size of the document made up of metadata and vector data becomes too large, and thus, searching a document or transferring a document between multiple MFPs takes too much time.

SUMMARY OF THE INVENTION

The present invention has been made in light of the above problem, for preventing the amount of metadata of an integrated document from becoming enormous.

The present invention provides an image processing apparatus comprising a vectorizing unit configured to convert bitmap image data into vectorized data, an integrated document generating unit configured to generate an integrated document which includes the vectorized data and metadata, an accompanying information extraction unit configured to extract one or more of accompanying information relating to the bitmap image data from the bitmap image data, and a registration unit configured to register the accompanying information that meets a predetermined condition out of the one or more of accompanying information extracted by the accompanying information extraction unit as the metadata of the integrated document, and not to register the accompanying information that does not meet the predetermined condition.

Also, the present invention provides a method for generating an integrated document, the method comprising converting bitmap image data to vectorized data; generating an integrated document which includes the vectorized data and metadata; extracting one or more of accompanying information relating to the bitmap image data from the bitmap image data; selecting accompanying information meeting conditions determined beforehand from the one or more of accompanying information; and registering the selected accompanying information as metadata of the integrated document.

Further features and aspects of the present invention will become apparent from the following description of exemplary embodiments with reference to the attached drawings.

BRIEF DESCRIPTION OF THE DRAWINGS

FIG. 6 is a diagram illustrating an example of results from performing region division as to the image data.

FIG. 16 is a diagram illustrating change in an object and metadata by the editing processing as to the integrated document.

FIG. 20 is a diagram illustrating an example of an editing information database sorted according to user, according to an embodiment of the present invention.

FIG. 26 is a flowchart to describe a modification example of editing keyword registration processing.

DESCRIPTION OF THE EMBODIMENTS

First Embodiment

Figure 1:
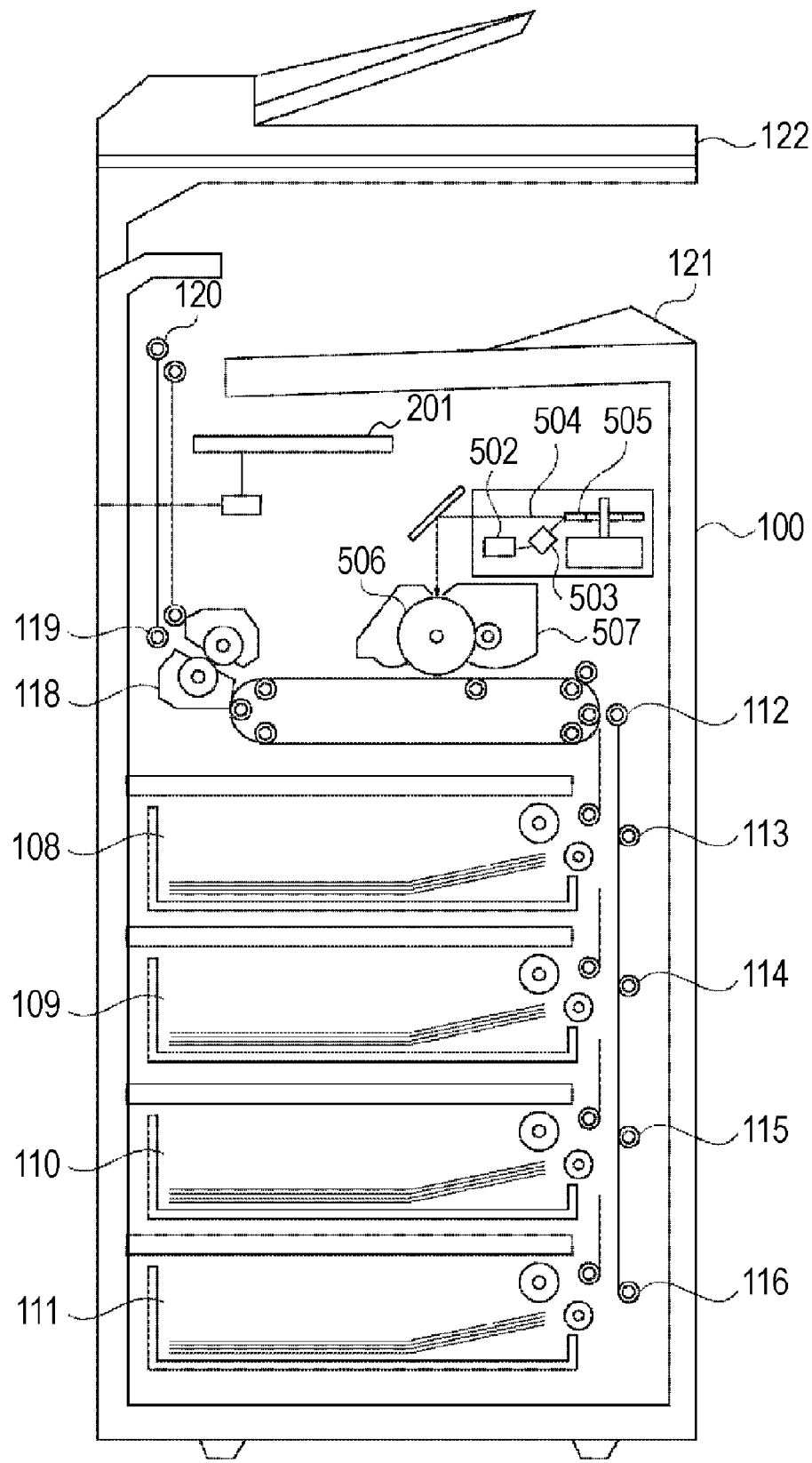
FIG. 1 is a cross-sectional diagram illustrating a configuration of an MFP which is an example of image processing according to an embodiment of the present invention.

FIG. 1 is a cross-sectional diagram illustrating the internal configuration of a combined image processing apparatus (hereafter called MFP: Multi Function Peripheral) having a printer function, copy function, and facsimile function, which is an example of an image processing apparatus according to the present invention.

In FIG. 1, 100 denotes an MFP, which can be used as a network printer which receives and prints printing data via a network. Also, the MFP 100 is also connected to a telephone circuit, can be used as a facsimile device as well, and further, can be used individually as a photocopier.

An operating panel 121 is made up of switches for operating and a liquid crystal touch panel to display the state of the MFP 100 and so forth. A control unit 201 controls the MFP 100.

A laser driver 502 is a circuit for driving a semiconductor laser oscillator 503, and switches a laser beam 504 on/off which is to be irradiated from the semiconductor laser oscillator 503 in accordance with input video signals. The laser beam 504 forms an electrostatic latent image on an electrostatic drum 506 by being reciprocally directed in the left and right directions by a rotatable polygon mirror 505 so as to scan over the electrostatic drum 506. Upon being developed by a developing unit (toner cartridge) 507 provided in the periphery of the electrostatic drum 506, the electrostatic latent image is transferred to recording sheets. Cut sheets are used for recording sheets. The cut sheets are stored in sheet supply cassettes 108, 109, 110, and 111 mounted on the MFP 100. The cut sheets are taken into the apparatus with sheet supply rollers 113, 114, 115, and 116, are placed on a sheet transporting belt 117 by a sheet conveying roller 112, and pass through the image forming and developing functions.

The toner (powdered ink) transferred onto the recording sheet is fused to the recording sheet with heat and pressure with a fusing unit 118. The recording sheet subjected to toner fusing is discharged outside the MFP 100 by conveying rollers 119 and 120.

A scanner unit 122 scans the document and picks up the reflected image thereof. The picked up image is subjected to A/D conversion and sent to a control unit 501, subjected to necessary processing and becomes a video signal, and is input to the laser driver 502.

Also, upon printing data being sent through an external network, the print data is analyzed at the control unit 201 and becomes a video signal, and is input to the laser driver 502.

Figure 2:
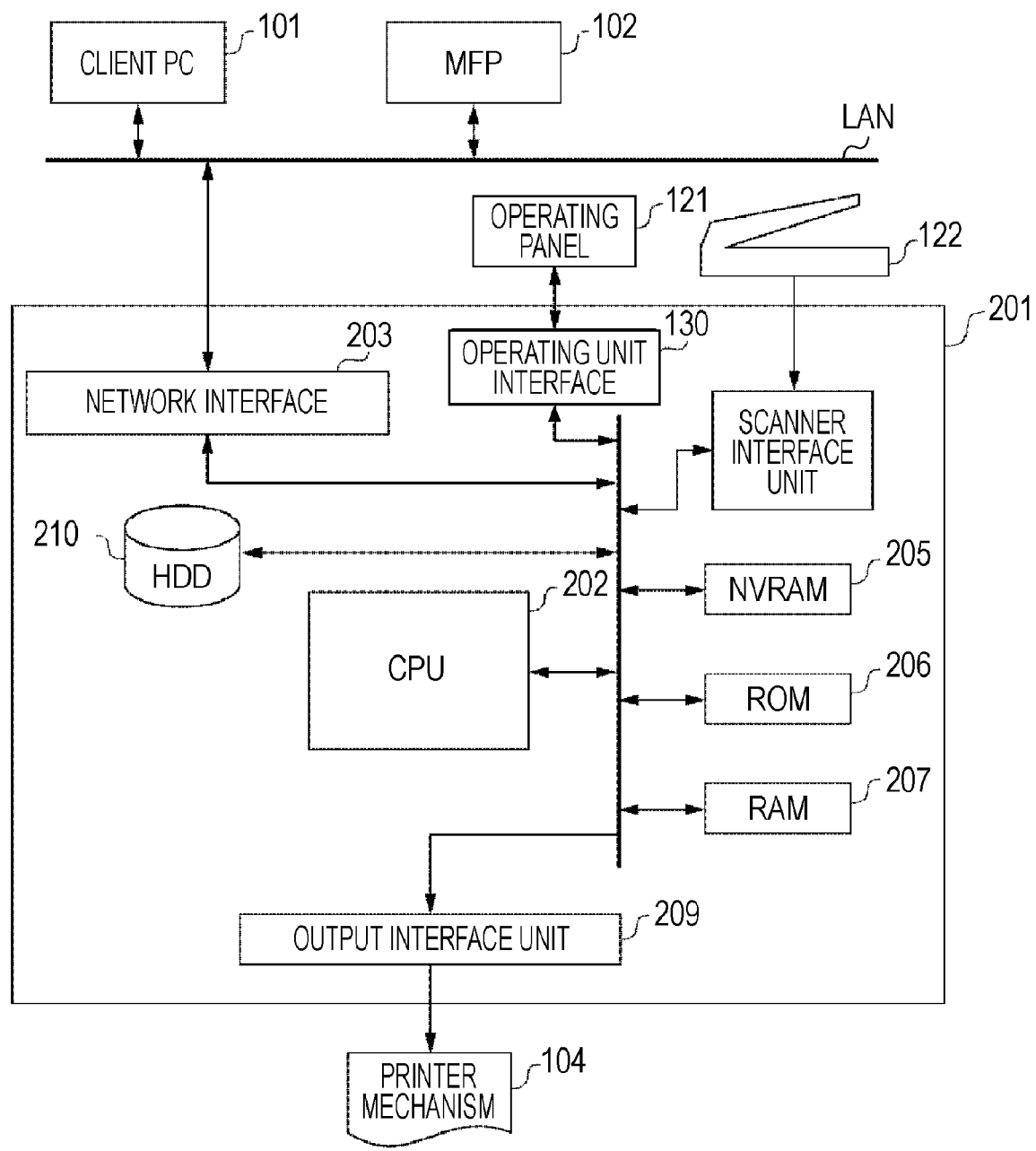
FIG. 2 is a block diagram illustrating hardware configuration of a control unit of the MFP according to an embodiment of the present invention.

FIG. 2 is a block diagram illustrating the hardware configuration of the control unit 201 of the MFP 100 shown in FIG. 1. The client PC 101 and MFP 102 are connected with the MFP 100 via a network (LAN). With the present embodiment, there may be multiple nodes on the network, such as a client PC or MFP. The scanner unit 122 corresponds to the scanner unit 122 in FIG. 1.

The network interface unit 203 governs an interface to the network for communication with other nodes on the network. For example, printing data such as PDL (Page Description Language) sent from the client PC 101 is received via the network interface unit 203. The network interface unit 203 can perform encrypted communication with other devices as needed.

The operating panel (operating unit) 121 is a user interface for the user to control the MFP 100. The operating panel 121 has a touch panel display and operating key, and provides an operating screen to the user while receiving operating instructions by the user. An operating unit interface 130 is an interface to connect the CPU 202 and operating panel 121. The operating panel 121 can also perform operations for another MFP via the network interface unit 203. Upon copy execution being instructed from the operating panel 121, the control unit 501 performs image processing relating to a video signal sent from the scanner unit 122 with the copy processing, and sends the video signal to a print mechanism unit 104 via the output interface unit 209 and performs copy processing.

The image processing performed here includes conversion from reading resolution of the scanner unit 122 to printing resolution of the print mechanism unit 104, and rotating processing of the image to match the conveying direction of sheets or of the print mechanism unit 104, for example.

A hard disk (HDD) 210 has stored therein image data, integrated documents to be described later, and various types of databases and so forth.

The processing order of the series of processing by the CPU 202 is programmed in a ROM 206 or HDD 210, and the CPU 202 loads these programs to a RAM 207 to execute. The RAM 207 can also be used as a temporary storage region for image processing as to the image data. Also, the data from the scanner unit 122 is stored in the RAM 207 and subjected to necessary processing. NVRAM (non Volatile RAM) 205 is non-volatile memory which is made up of EEPROM or the like. The NVRAM 205 stores various types of setting values of the MFP 100. Note that the MFP 100 in FIG. 1 is made up of the control unit 201, operating panel 121, scanner unit 122, and print mechanism unit 104.

Figure 3:
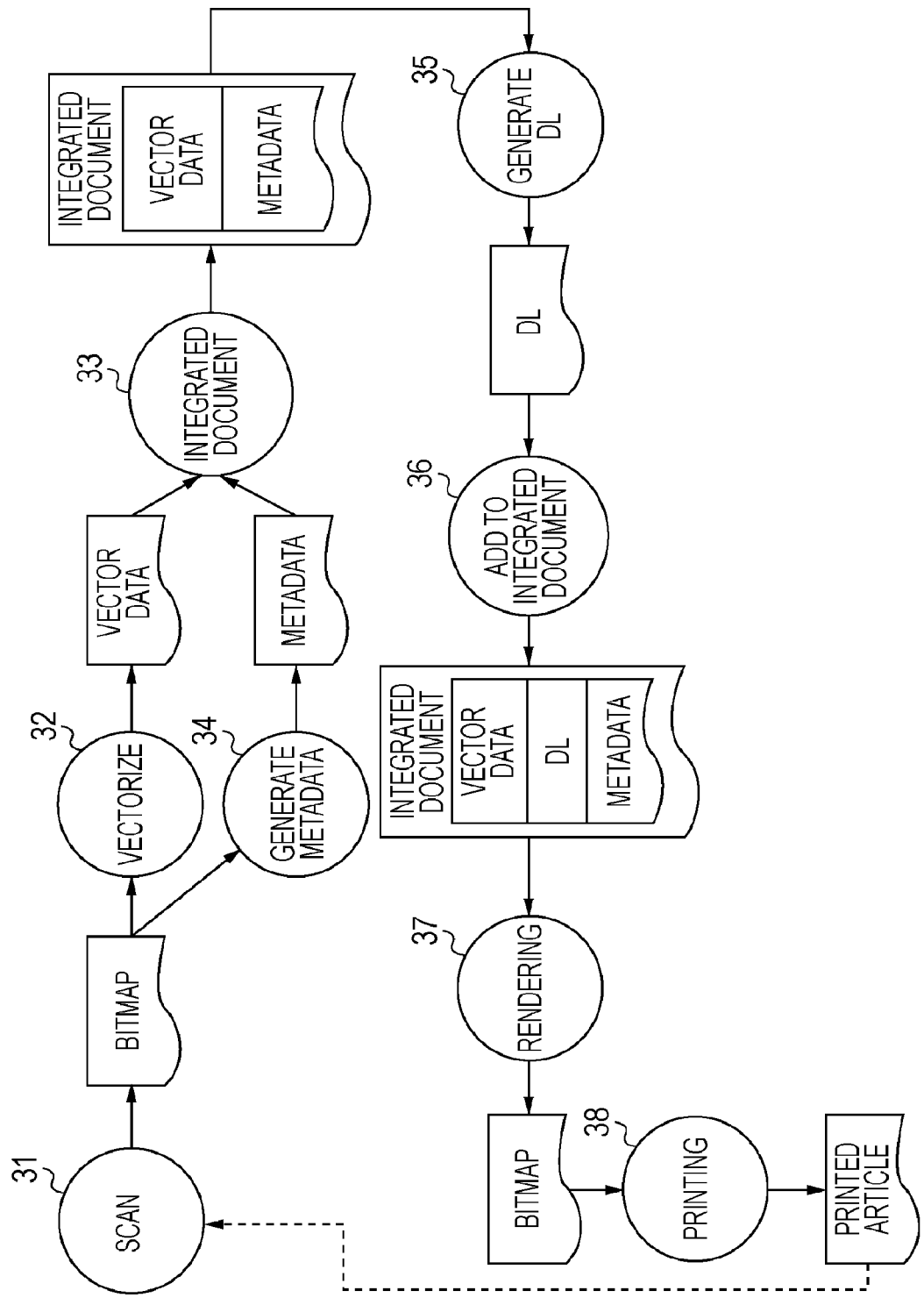
FIG. 3 is a diagram illustrating an example of data flow at the time of copy operations by the MFP according to an embodiment of the present invention.

FIG. 3 is a diagram illustrating an example of dataflow at the time of copy operations by the MFP according to the present embodiment. The copy operations are executed by the CPU 202 of the MFP 100 loading the program stored in the HDD 210 or ROM 206 in the RAM 207, and are realized by operating necessary hardware in the MFP 100.

The paper document set in the scanner unit 122 is read by a scan processing 31. The image data generated by the document being read is converted to bitmap data. Next, vector data is generated from the bitmap data with vectorizing processing 32, and metadata is generated with metadata generating processing 34. The vector data is data after performing vectorizing processing as to the bitmap data. Also, the metadata is secondary (accompanying) information relating to the bitmap data. That is to say, the metadata is secondary information (accompanying information) or a collection of secondary information of bitmap data or relating to the integrated document generated based on the bitmap data. The metadata can be used as an index in the case of searching for the integrated document, for example. Specific generating methods for the vector data and metadata will be described later.

Next, an integrated document associated with the vector data and metadata by the integrated document generating processing 33 is generated. A display list (DL) is then generated from the vector data in the integrated document with DL generating processing 35, and the generated DL is stored in the integrated document (36). The DL is an intermediate code generated in an intermediate stage while the vector data is subjected to render and convert to bitmap. Generally, rendering the DL into bitmap, rather than rendering vector data into bitmap, enables expansion processing at a higher speed. The DL is then sent to rendering processing 37 and is rendered into bitmap.

Data having the two types of vector data and metadata generated by the processing in the integrated document generating processing 33 integrated, or the data having the three types of vector data, metadata, and DL generated with the processing in 36 integrated, is called an "integrated document" in the present embodiment.

The rendered bitmap is recorded onto a paper medium at the printing processing 38 and is obtained as a printed article. Note that the output printed article can be set on an original exposure unit to perform processing again starting with the scanning processing 31.

With the copy operations in FIG. 3, the bitmap data obtained by scanning the document is temporarily converted to an integrated document and then converted to bitmap again to perform printing processing. The processing to temporarily vectorize the bitmap data and then convert to bitmap again may appear to involve unnecessary conversion processing, but there are the following advantages. For example, in the case of performing copy operations along with enlargement/reduction processing, the enlargement/reduction processing is performed to the vector data after converting to the integrated document, whereby enlargement/reduction processing to the bitmap data is unnecessary. Generally, enlargement/reduction processing to the bitmap data often results in reduced image quality. However, if the enlargement/reduction processing is performed with the vector data converted from the bitmap data, such image quality reduction does not need to occur.

Figure 4:
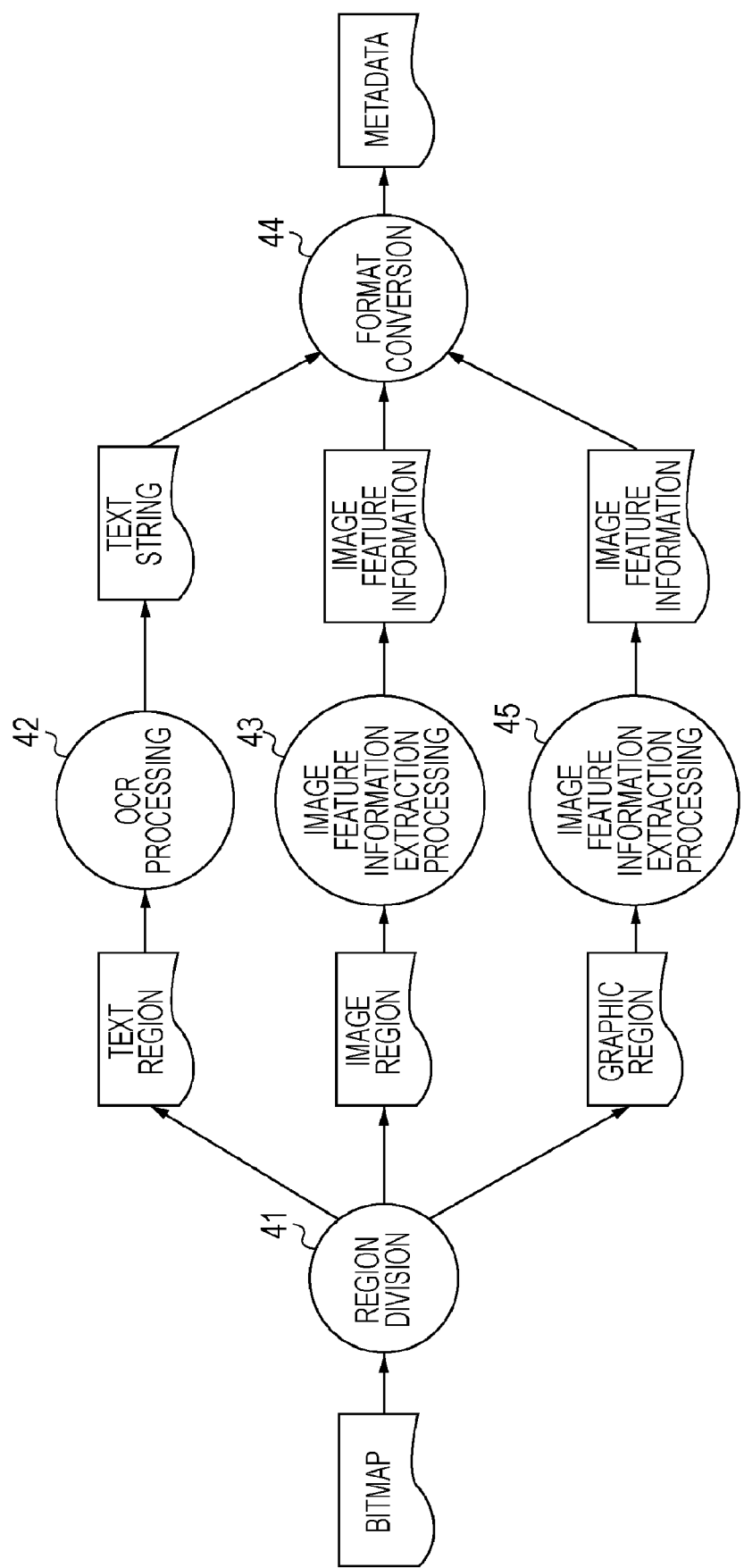
FIG. 4 is a diagram illustrating an example of data flow in the metadata generating processing according to an embodiment of the present invention.

FIG. 4 illustrates specific data flow of the metadata generating processing 34 shown in FIG. 3. This processing is executed by the CPU 202 of the MFP 100 loading the program stored in the HDD 210 or ROM 206 in the RAM 207, and is realized by operating necessary hardware in the MFP 100.

First, region division from the bitmap is performed in region division processing 41. Region division is processing whereby the input bitmap image data is analyzed, divided into regions for each cluster of objects included in the image, subjected to determination of the attributes of each region, and separated into types. Attributes may be the types of text (TEXT), images (PHOTO), lines (LINE), graphics (GRAPHIC), tables (TABLE), and so forth.

FIG. 6 illustrates an example of the results from performing region division as to the input image data. The result of performing region division as to the input image 61 is determination result 62. In the determination result 62, the portion surrounded with a dotted line represents one unit of an object of the result of analyzing the image, and the type of attribute appended as to each object is the determination result of the region division.

The region of text attributes from the regions divided according to attributes is subjected to text recognition processing with OCR processing 42, and is converted to a text string. That is to say, this text string is the text string printed on the face of the paper.

On the other hand, the region of image attributes from the regions divided according to attributes is converted to image feature information through image feature information extraction processing 43. Image feature information is a text string showing the features of the image, and for example is a text string such as "flower" or "face". Also, the regions of graphics attributes is also subjected to image feature information extraction processing 45 and converted to image feature information. For extraction of image feature information, generally-used image recognition technology such as image feature amount (frequency value or density of the pixels making up the image) detection or face recognition or the like may be used. The generated text string and image information are arranged into a later-described data format with format conversion processing 44, whereby metadata is generated.

Figure 5:
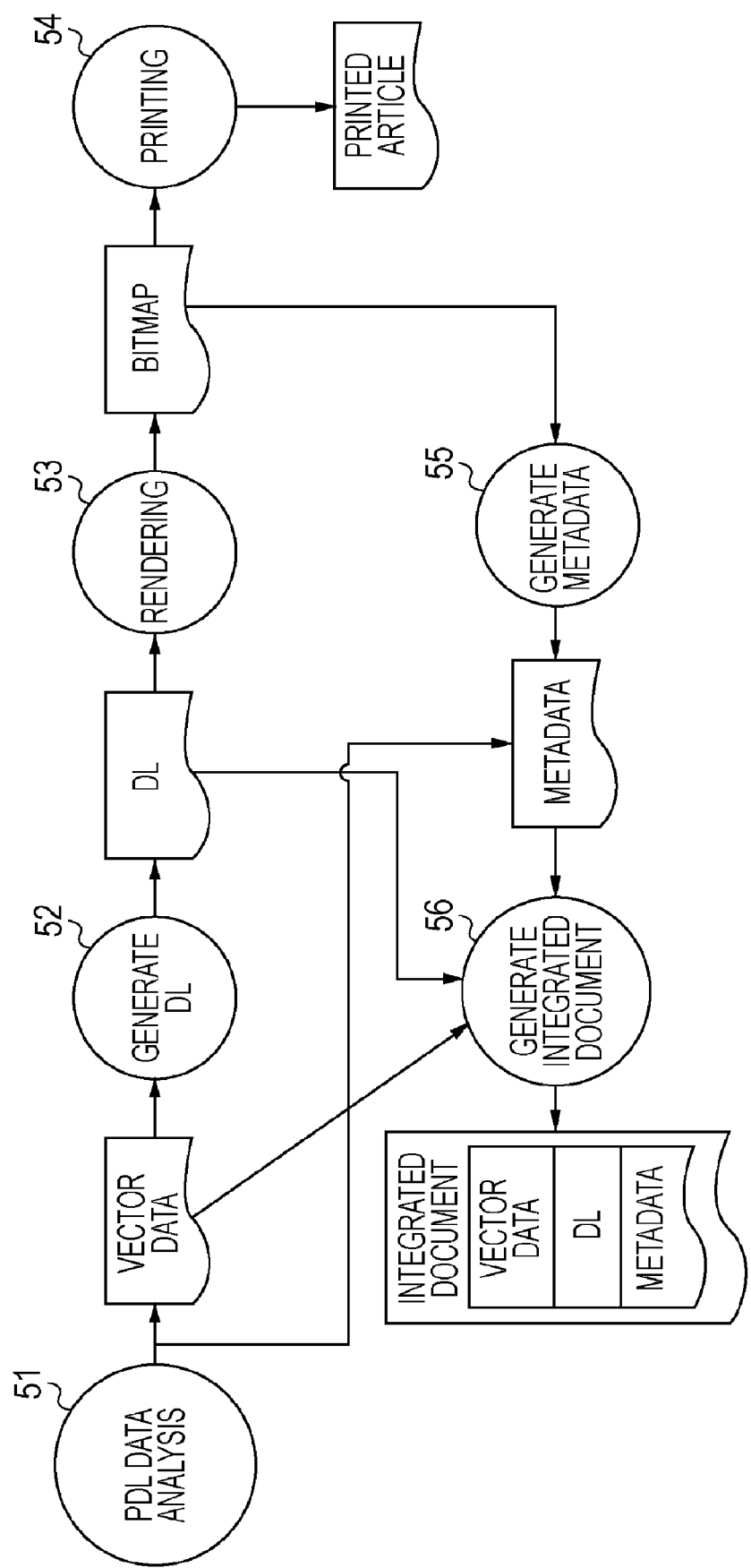
FIG. 5 is a diagram illustrating an example of data flow at the time of printing PDL (Page Description Language) according to an embodiment of the present invention.

FIG. 5 is a data flow at the time of PDL (Page Description Language) printing. PDL printing is a printing operation which receives and outputs the page description language (PDL) generated with a printer driver on the PC in the case that printing instructions are received from application software on a PC (Personal Computer). The PDL printing operation is executed by the CPU 202 of the MFP 100 loading the program stored in the HDD 210 or ROM 206 in the RAM 207, and is realized by operating necessary hardware in the MFP 100.

First, the received PDL data is analyzed by PDL data analysis processing 51, whereby vector data is generated. Next, a DL is generated from the vector data with DL generating processing 52, and the generated DL is stored in the integrated document while being sent to the rendering processing 53 and rendered into bitmap. The rendered bitmap is recorded on a paper medium by the printing processing 54 and becomes a printed article. The vector data and DL generated in this process are stored in the integrated document by integrated document generating processing 56.

Further, the text strings and image feature information are generated as metadata, similar to at the time of copy operations, by the metadata generating processing 55 described in FIG. 4 from the bitmap generated with the rendering processing 53, and is stored in the integrated document.

Also, there are various types of PDL such as LIPS (LBP Image Processing System®) or PS (PostScript®) for example, but depending on the PDL type, some have text string information in the PDL. In this case, an arrangement may be made wherein the text string is extracted at the time of PDL analysis, and metadata is generated from a text string and stored in the integrated document.

Figure 7:
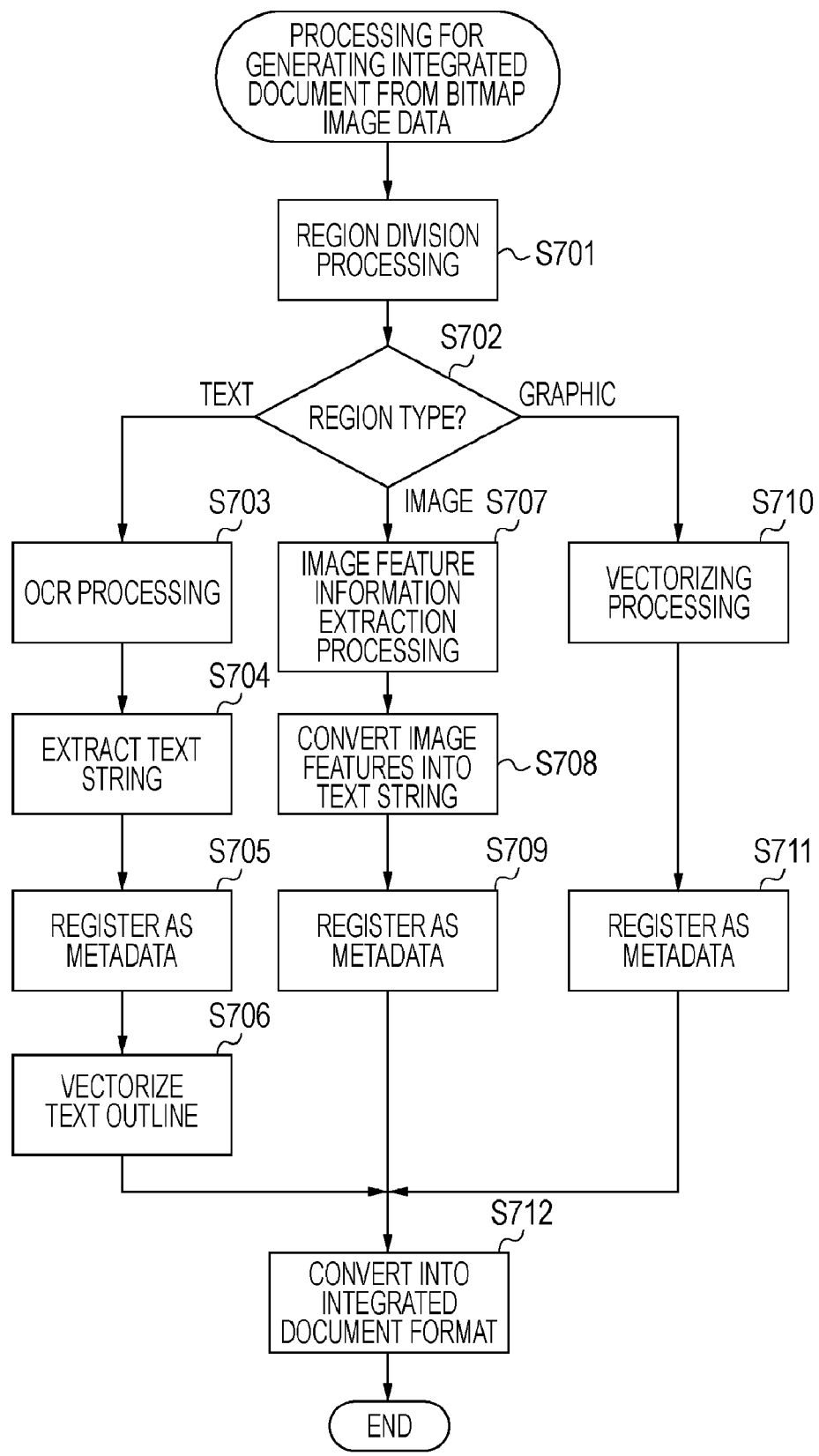
FIG. 7 is a flowchart illustrating an example of integrated document generating processing according to an embodiment of the present invention.

Next, the integrated document generating processing and printing processing will be described with reference to the flowchart in FIG. 7. This flowchart illustrates the integrated document generating processing according to the present embodiment. This processing is for receiving bitmap data and generating a document made up of vector data, DL, and metadata. This processing is similar to the processing of 32 through 36 of the data flow in FIG. 3. Also, the bitmap data is equivalent to the bitmap data obtained by the scan processing 31 in FIG. 3 and so forth, for example. The present flowchart is executed with the CPU 202 of the MFP 100.

First, the region division processing described above is performed in step S701. Next, in step S702, the types (attributes) of regions are separated into TEXT, GRAPHIC, and IMAGE, and separate processing is performed as to each of these. In FIG. 6, an example of dividing the attributes into TEXT, PHOTO, LINE, GRAPHIC, TABLE is illustrated, but in the example in FIG. 7, division is made into the three types of TEXT, GRAPHIC, and IMAGE. The image regions may be divided with another dividing method. In the case that the region attribute is TEXT, the flow is advanced to step S703 and OCR processing is performed, after which text string (keyword) extraction is performed in step S704. Thereafter, the text string is registered as metadata in step S705, the flow is advanced to step S706, and the recognized text outlines are converted to vector data.

The metadata generated from the text string is a list of text codes, but the list of text codes is information necessary for a keyword search. However, with the OCR processing even if the text code is recognized, font face such as "Times New Roman", "Arial", or font size such as "10 pt", "12 pt", or font style such as "italic", "bold" cannot be recognized. Accordingly, for drawing, it is necessary to save text outlines as vector data rather than using text codes. In step S704, the outlines of the text image is converted to vector data, whereby even if the font face or font size or font style cannot be recognized, the font face or font size or font style of the text in the bitmap image can be realized again.

On the other hand, in the case that the region attribute is IMAGE in step S702, the flow is advanced to step S707 and image information extraction processing is performed.

In step S707, as described above, general-purpose image recognition technology such as image feature value detection and face recognition is used to detect the image features, and image feature information which is information showing the features of the image is extracted. Next, in step S708, the image feature information extracted earlier is converted to a text string. This conversion can be readily realized if a table correlating the image feature information and text string is maintained. Thereafter, the text string is registered as metadata in step S709.

Vectorizing is not performed as to the image of the regions divided as IMAGE, and the image data is held without change as vector data in the integrated document.

In the case that the region attribute in step S702 is GRAPHIC, the flow is advanced to step S710 and vectorizing processing is performed, and registration of the metadata is performed in step S711. In step S711, the metadata obtained by performing processing to convert image features to a text string is registered, as performed in step S707 and S708 for example. In step S712, the vector data and metadata generated from the various regions are converted into a document format. The flow in the flowchart is then ended.

Note that an arrangement may be made wherein a display list (DL) is further generated from the vector data generated in the vectorizing processing in step S706 and step S710, and the DL included in the integrated document.

Figure 8:
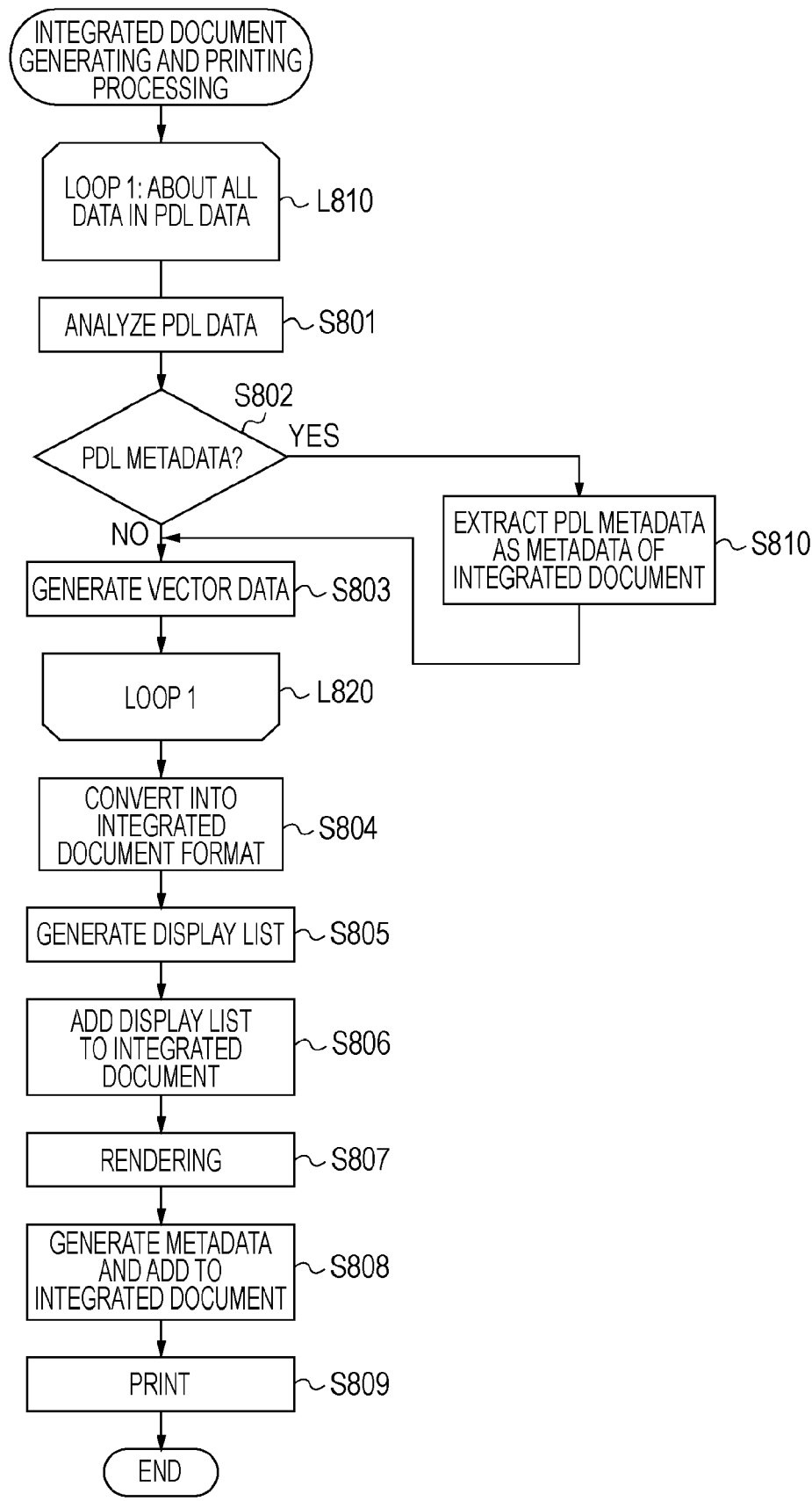
FIG. 8 is a flowchart illustrating an example of the integrated document generating processing from the PDL according to an embodiment of the present invention.

FIG. 8 is a flowchart illustrating an example of the integrated document generating/printing processing from the PDL. This processing receives PDL data externally, and is processing to generate the integrated document and perform printing output, and is equivalent to the processing performed in the data flow in FIG. 5. The present flowchart is executed with the CPU 202 of the MFP 100.

For all of the data in the received PDL, the processing in a loop 1 between L810 and L820 is repeated. First, the PDL data is analyzed in step S801. In step S802, as a result of the analysis, determination is made as to whether the metadata such as text string information is included in the PDL. In the case determination is made that metadata is included in the PDL (Yes in step S802), the flow is advanced to step S810 and the metadata in the PDL is extracted. The flow is then advanced to step S803.

On the other hand, in step S802, in the case that the analyzed PDL data is data other than metadata such as text string information (NO in step S802), for example, the data is a drawing command or the like, the flow is advanced to step S803 and the data is converted to vector data. The flow is then advanced to step S804 and data is converted to an integrated document format.

Next, in step S805, the DL is generated based on the vector data, the flow is advanced to step S806, and the generated DL is added to the integrated document.

Rendering processing is performed to the DL based on the vector data in the integrated document in step S807. Further, in step S808, the DL is added as metadata in the integrated document along with the metadata created from the bitmap data after rendering and being extracted in step S809. In step S809, printing processing is performed as to the paper medium based on the bitmap data after rendering. The flow of the present flowchart is then ended.

Figure 9:
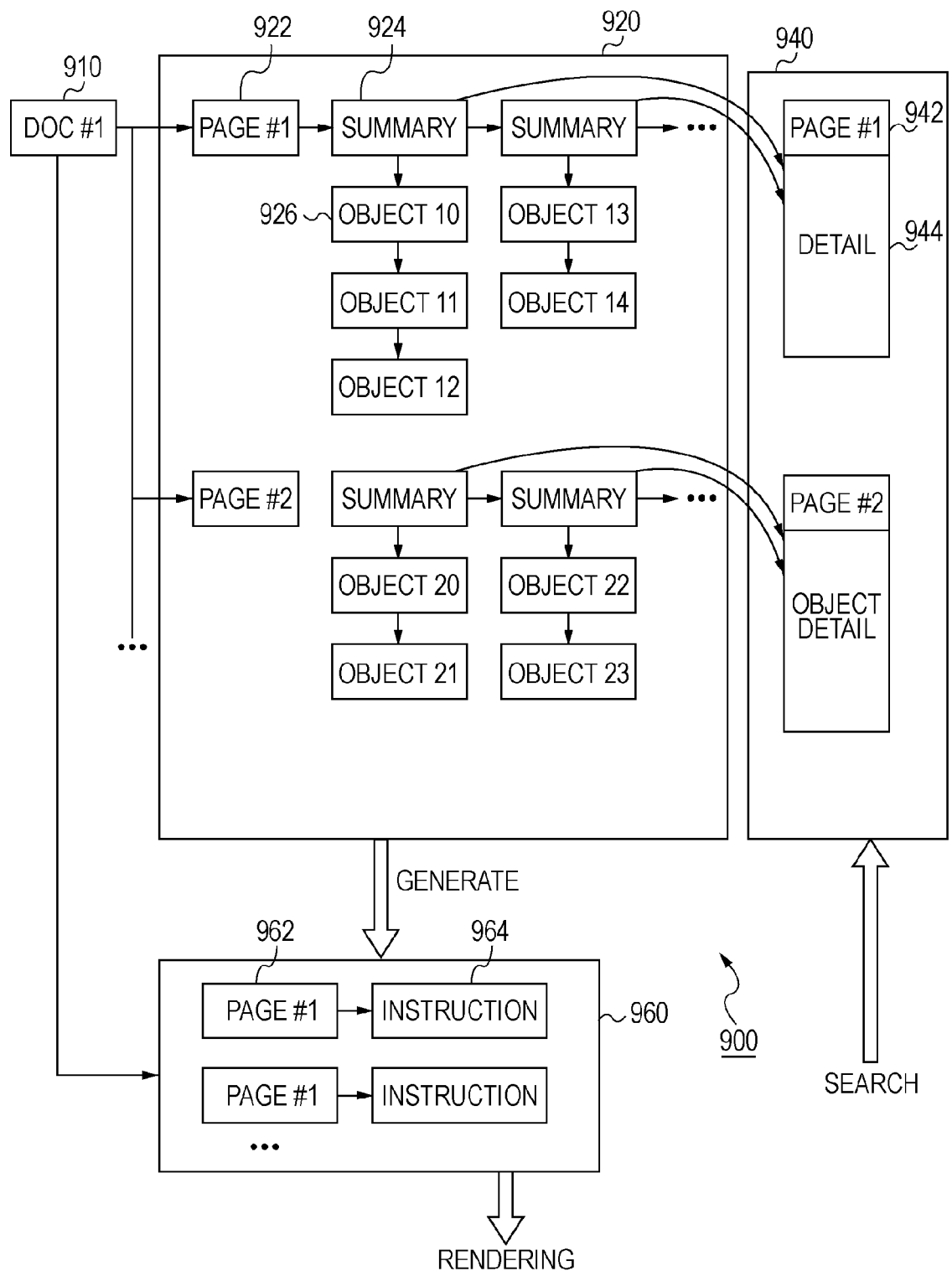
FIG. 9 is a diagram illustrating an example of integrated document configuration according to an embodiment of the present invention.

Next, the configuration of the integrated document will be described. FIG. 9 is a diagram showing an example of a configuration of the integrated document. The integrated document 900 is data made up of multiple pages, and made up of the largely divided categories of vector data 920, metadata 940, and DL 960, and has a hierarchical configuration with a document header 910 as the lead thereof. The vector data 920 is further made up of a page header 922, summary information 924, and object 926. The metadata 940 is further made up of page information 942 and detailed information 944. The DL 960 is further made up of a page header 962 and instruction 964 for drawing expansion.

The document header 910 has the storage location for the vector data 920 and the storage location of the DL 960 written therein, whereby the vector data 920 and DL 960 are associated by the document header 910.

The vector data 920 is generated by executing at least one of multiple processing such as text recognition processing, outlining processing, and graphics recognition processing as to the bitmap data. The vector data (vectorized data) is an image which defines, as a mathematical expression, supplementing multiple pixels making up straight lines or curved lines, which are obtained by executing at least one of the above-described processing. Note that with the present embodiment, data of which at least one portion of the bitmap data is vectorized is considered to be vector data.

The vector data 920 is drawing data independent of resolution, whereby the page header 922 has layout information such as page size or direction and so forth written therein. The object 926 has drawing data such as lines, polygons, and Bezier curves linked one at a time thereto, and multiple objects are associated together with summary information 924. The summary information 924 expresses the features of multiple objects together, and the attribute information of the division regions described in FIG. 6 are written therein. Multiple objects associated in one summary information become objects with the same image attribute.

The metadata 940 is not directly related to the drawing processing, but is additional information primarily used for searching. Page information such as whether the metadata is generated from the bitmap data or generated from PDL data, for example, is written in the page information 942 region with a text string (character code) generated as OCR information and image information in the detailed information 944.

Also, metadata is referenced from the summary information 924 of the vector data 920, and the detailed information 944 of the metadata 940 can be found from the summary information 924.

The DL 960 is an intermediate code for a renderer to perform bitmap expansion. A management table for drawing information (instruction) in the page and so forth is written in the page header 962, and the instruction 964 is made up of drawing information which is dependent on resolution.

Figure 10A:
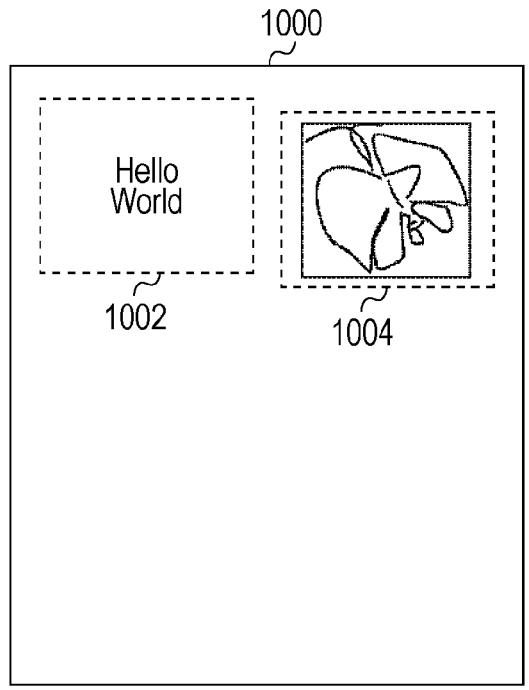
FIGS. 10A and 10B are diagrams illustrating a specific example of an integrated document according to an embodiment of the present invention.
Figure 10B:
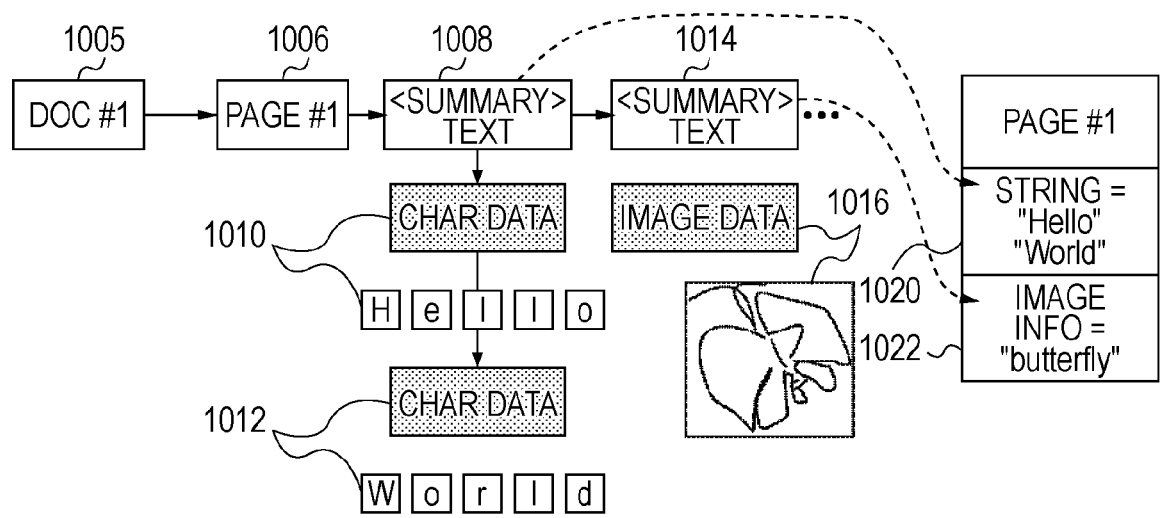

FIGS. 10A and 10B are diagrams illustrating a specific example of an integrated document. The integrated document generated based on FIG. 10A which is a bitmap image is illustrated in FIG. 10B. A bitmap image 1000 in FIG. 10A is an image including a text region (TEXT) 1002 and an image region (IMAGE) 1004 showing the photograph of a butterfly. Such a data configuration of an integrated document having converted a bitmap image is shown in FIG. 10B.

In FIG. 10B, a page header 1006, summary information 1008 corresponding to the "TEXT" region, and summary information 1014 corresponding to the "IMAGE" region are linked to a document header 1005. The "TEXT" summary information 1008 is linked with the text outlines of the object 1010 H, e, l, l, o and the object 1012 W, o, r, l, d as vector data. Further, metadata 1020 with a text code string of "Hello" "World" stored therein is linked from the summary information 1008. Also, an object 1016 of a photographic image (e.g. image data in JPEG format) of a butterfly is linked to the "IMAGE" summary information 1014. Further, image feature information 1022 called "butterfly" is referenced from the "IMAGE" summary information 1014.

For example, in the case of searching for text within integrated document with a keyword "World", detecting can be performed with the following procedures. First, vector page data is sequentially obtained from the document header, and the metadata (1020 in the case of FIG. 10B) linked to the summary information (1008 in the case of FIG. 10B) is searched in the "TEXT" region from the summary information linked to the page header.

Figure 11A:
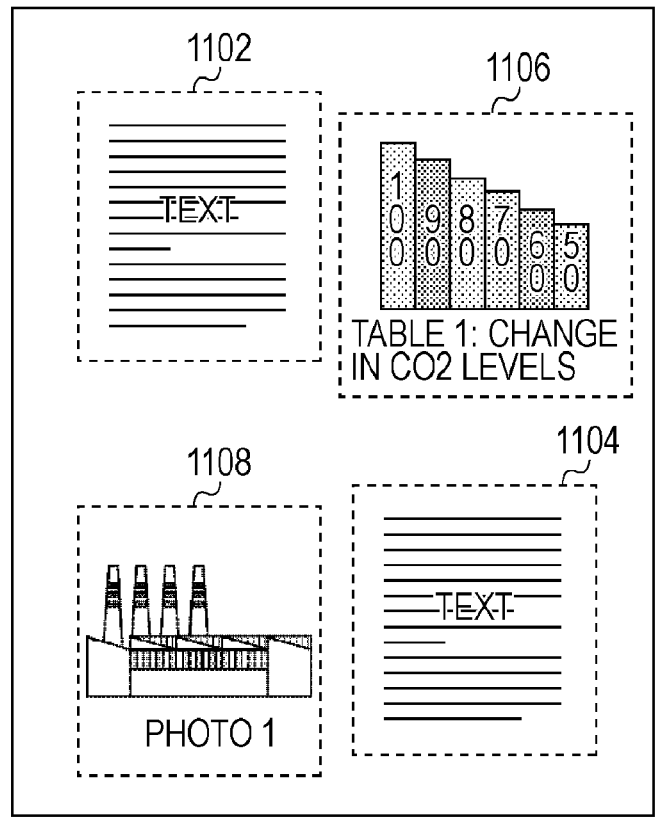
FIGS. 11A and 11B are diagrams illustrating another example of an integrated document according to an embodiment of the present invention.
Figure 11B:
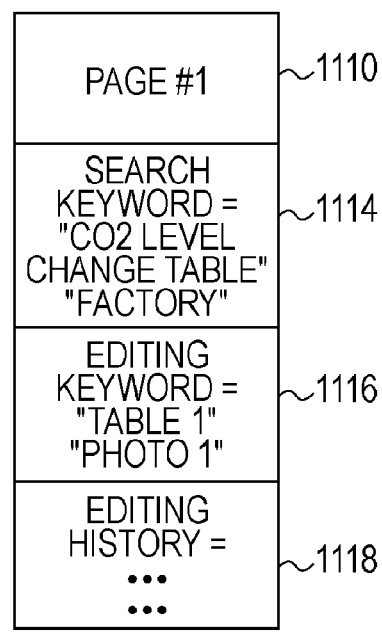

FIGS. 11A and 11B are diagrams illustrating another example of an integrated document according to the present embodiment. The type of metadata is different compared to the integrated document in FIGS. 10A and 10B.

The image in FIG. 11A is made up of a "TEXT" region (1102, 1104), graph 1106 which is a "GRAPHIC" region, and photograph 1108 of a factory which is an "IMAGE" region.

FIG. 11B is a diagram showing metadata portion with the data configuration in the case of converting the image in FIG. 11A to an integrated document. The metadata in FIG. 11B is made up of a page header 1110, search keyword 1114, editing keyword 1116, editing history 1118.

The search keyword 1114 is a region wherein a keyword likely to be used for searching within the image in FIG. 11A is stored as metadata. Normally, the search keyword has document feature stored therewithin, and in the case of image data such as FIG. 11A, "CO2 level change table" showing the content of a graph in the "GRAPHIC" region or "factory" showing a photograph of a factory in the "IMAGE" region is equivalent thereto. These keywords are stored in the search keyword 1114.

The editing keyword 1116 is a region wherein a keyword likely to be subjected to editing within the image in FIG. 11A is stored as metadata. Normally, an object expressing a document feature in a document is not often changed. For example, in a document with the content V"global warming", if the keyword "warming" is changed, the document becomes an entirely different document so is not likely to be changed. Conversely, graphs and tables are subjected to value updates so are likely to be edited. Also, a word such as "figure" in the title of a diagram is likely to be converted to a word such as "Fig". Thus, words or diagrams likely to be edited are stored in the editing keyword 1116 as search keywords for editing. In FIG. 11A, "Table 1", "Photograph 1", etc. are stored in the editing keyword 1116 in the metadata showing in FIG. 11B as editing keywords.

Further, the editing history 1118 can be stored in FIG. 11B as metadata. By recording the editing history as metadata, what type of keyword has been edited can be learned, and what type of keyword should be selected as an editing keyword can be determined.

Figure 12:
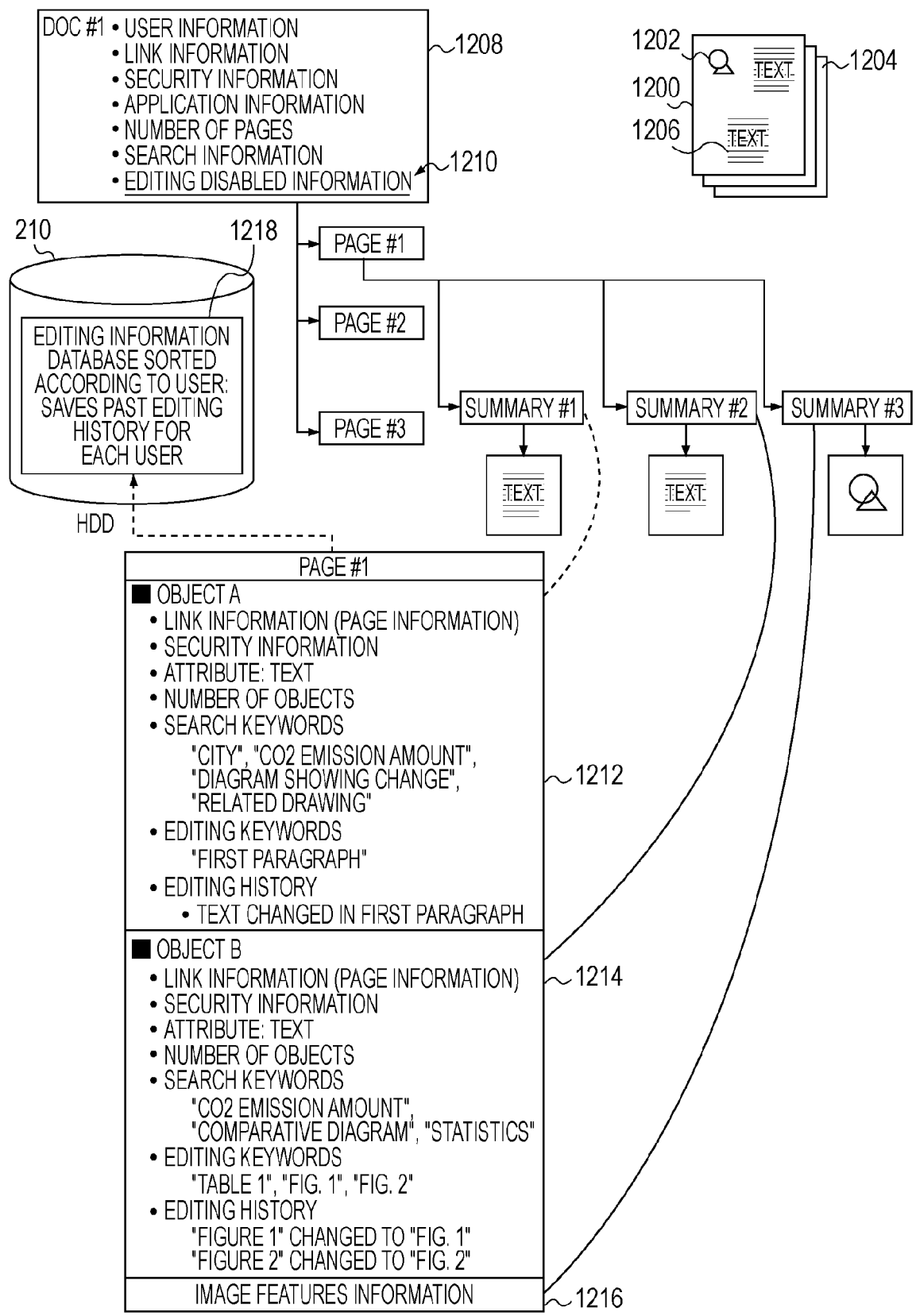
FIG. 12 is a diagram illustrating an example of editing processing of an integrated document according to an embodiment of the present invention.

FIG. 12 is a diagram illustrating an example of editing processing of the integrated document. When the image data 1200 of 3 pages is converted into an integrated document, an integrated document having the data configuration specified in a document header 1208 is generated. The first page of the image data 1200 is made up of three regions which are an "IMAGE" object region 1202, a "TEXT" object A 1204, and a "TEXT" object B 1206. The integrated document shown with the document header 1201 has summary information, objects, and metadata, similar to the description up to now. Note that the integrated document in FIG. 12 has editing disabling information 1210 in the document header 1208. By turning the editing disabling information in the document header 1208 to "editing disabling: ON", editing can be disabled as to all of the objects in the integrated document. Also, by causing the page header and summary information to have editing disabling information, editing restrictions can be performed in page increments and object increments. The editing disabling information is normally realized with a flag. Alternatively, a password for removing the editing disable may also be used.

The metadata 1212 is metadata corresponding to the "TEXT" object A 1204. The metadata 1212 includes a search keyword region, editing keyword region, and editing history region. Each of these regions included in the metadata 1212 form a group of text strings as metadata. The metadata 1212 has words such as "city", "CO2 emission amount" "diagram showing change" "related drawings" and the like as search keywords, "first paragraph" as an editing keyword, and "text change in first paragraph" as an editing history.

The metadata 1214 is metadata corresponding to the "TEXT" object B 1206. The metadata 1214 includes "CO2 emission amount", "comparative diagram", and "statistics" as search keywords and "Table 1", "FIG. 1", and "FIG. 2" as editing keywords. Further, information that "FIG. 1" has been changed to "FIG. 1" and "FIG. 2" has been changed to "FIG. 2" is stored as editing history.

The metadata 1216 is metadata corresponding to the "IMAGE" object 1202. Image feature information of the object 1202 is stored herein.

The HDD 210 has a database wherein editing history as to the integrated document and the generated editing keywords are recorded for each user. The editing history and editing keywords included in the metadata in the integrated document are collected, divided out by each user who performed editing processing, and stores this in the HDD 210.

The editing information database 1218 is a database configured within the HDD 210 of the MFP 100. Editing history as to the integrated document is saved in the editing information database 1218 for each user. The keywords saved in the editing information database 1218 are keywords which are likely to be used for searching in the event of editing the integrated document. This will be described in detail later. If, of the text strings obtained from objects in the integrated document, a text string matching the keyword saved in the editing information database 1218 is registered as metadata, a text string with a high probability of being used for searching and editing can become metadata. Thus, all of the secondary information does not need to be registered as metadata, and overly expansive metadata of the integrated document can be prevented. The editing information database 1218 only needs to be a database which stores text strings to become metadata, so other than editing history as to the integrated document, the database may be one which is formed from keywords used in searches for the integrated document. Alternatively, this may be a database wherein keywords frequently used for searches are registered. Also, the editing information database 1218 may be configured within a storage device other than the HDD 210. For example, a database server other than the MFP may be prepared separately and the editing information database 1218 may be configured within this database server.

Figure 13:
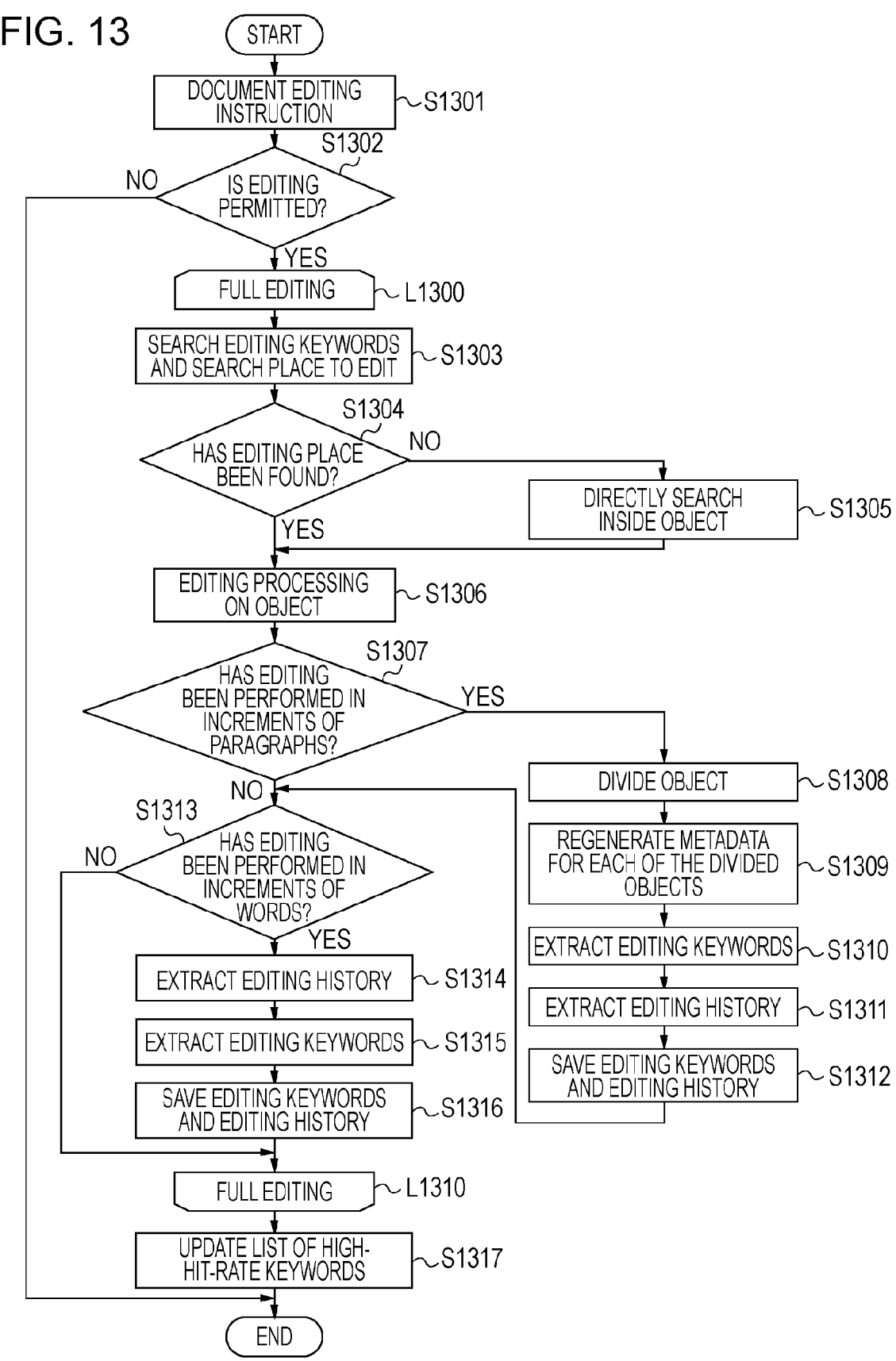
FIG. 13 is a flowchart illustrating an example of editing processing of an integrated document according to an embodiment of the present invention.

FIG. 13 is a flowchart showing an example of the editing processing of the integrated document with the image processing apparatus. The present flowchart is executed with the CPU 202 of the MFP 100.

First, in step S1301, editing instructions for the integrated document are received by the user operating the operating panel 121. In step S1301, the operating panel 121 has operating screen such as that shown in FIGS. 14 and 15 displayed thereupon.

Figure 14A:
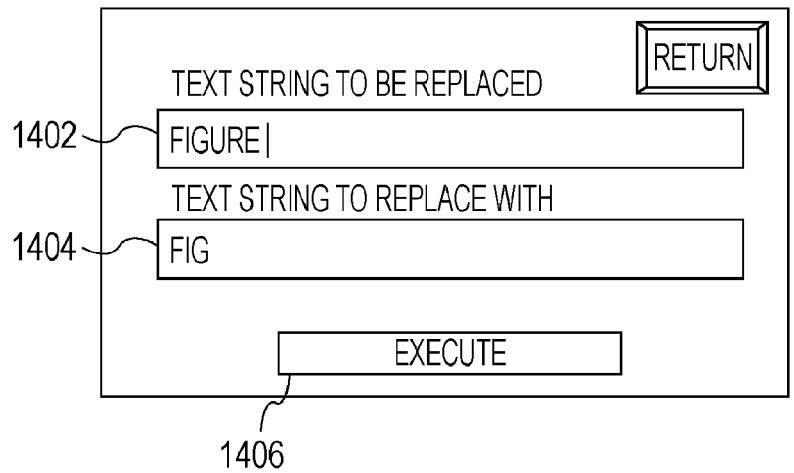
FIGS. 14A through 14C are diagrams illustrating a display example of an operating panel of an MFP according to an embodiment of the present invention.
Figure 14B:
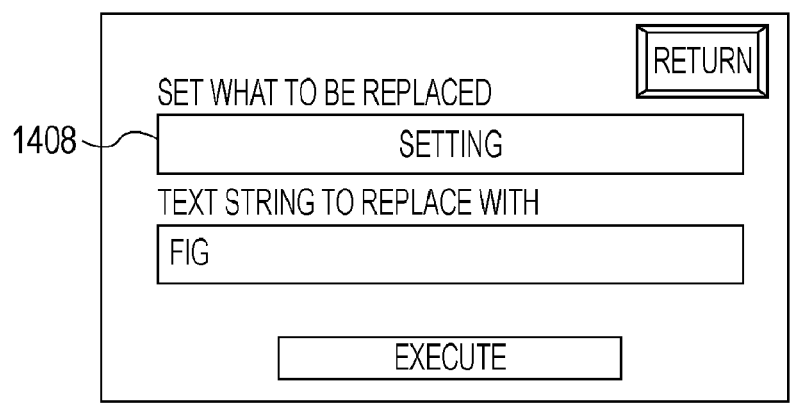
Figure 14C:
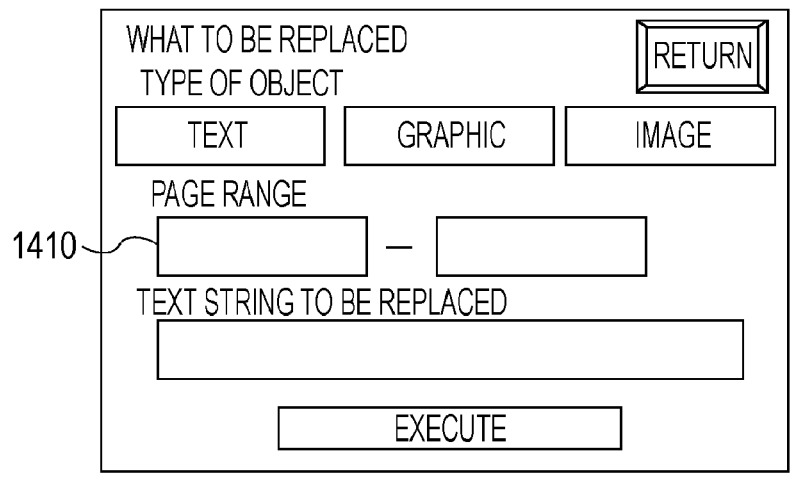

FIGS. 14A through 14C are diagrams showing a display example of the operating panel of the MFP. As an editing example of the integrated document, the case of changing the word "Figure", which is a word in the integrated document, into "Fig" will be described. FIG. 14A shows an area (1402) to input a text string to be replaced and an area (1404) to input a text string to replace with in the operating panel 121. The user inputs the text string to be replaced in the input area 1402 under "text string to be replaced" and inputs the text string to replace with in the input area 1404 under "text string to replace with". In this case, "Figure" is input as the text string to be replaced, and "Fig" is input as the text string to replace with. Subsequently, upon the execution button 1406 being pressed, the screen transitions to the screen in FIG. 14B.

A replacement setting button 1408 is displayed on the screen FIG. 14B. Upon the user pressing this button 1408, the screen is transitioned to the screen in FIG. 14C. With the screen in FIG. 14C, conditions for the replacement text strings can be input. The three buttons under "type of object" in the drawing indicate types of drawing objects including the text strings. Selection of an object does not need to be exclusive and multiple objects may be selected. A page range input area 1410 thereunder is an input area for specifying the page ranges subject to replacement. Although not described in the above description, condition settings may be added such as a proximity search.

In FIGS. 14A through 14C, a display example is shown for an operating panel 121 in the case of performing replacement of a text string in an integrated document, but editing to replace a paragraph within the integrated document with another paragraph may also be performed.

Figure 15A:
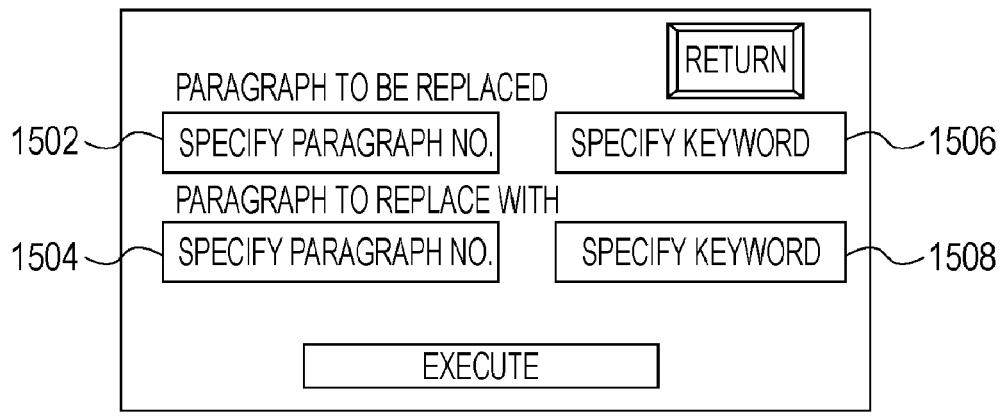
FIGS. 15A through 15C are diagrams illustrating a display example of the operating panel in the case of replacing a paragraph in the integrated document with another paragraph.
Figure 15B:
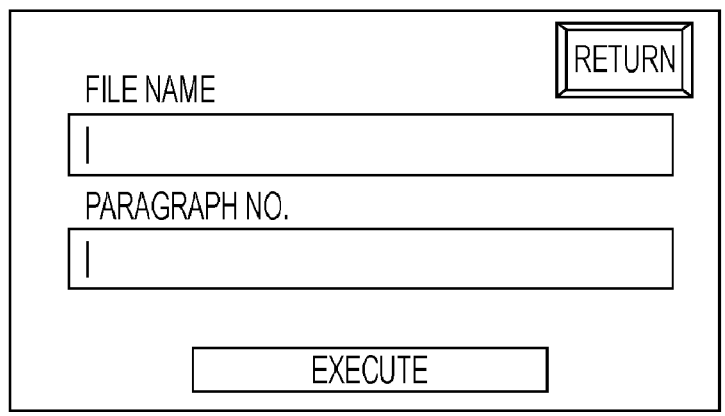
Figure 15C:
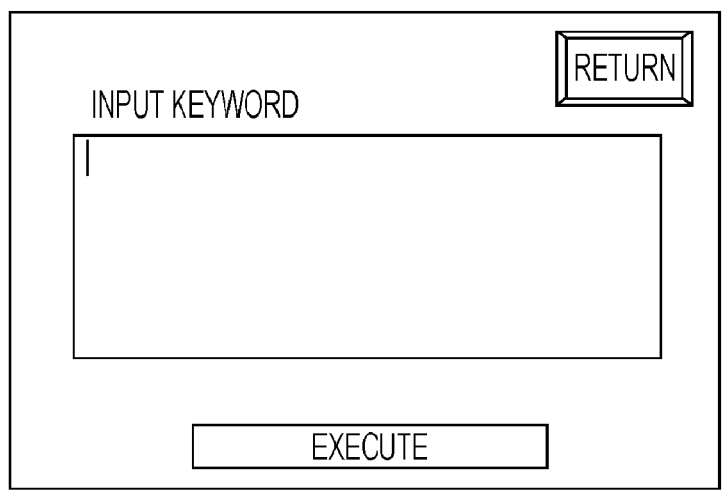

FIGS. 15A through 15C are diagrams illustrating a display example of the operating panel in the case of replacing a paragraph in the integrated document with another paragraph. In FIG. 15A, the paragraph to be replaced is specified as "paragraph to be replaced". Also, the paragraph to replace with is specified as "paragraph to replace with". There are two methods of specifying the paragraph, and in "specify paragraph No." (1502, 1504), the paragraph is specified by the file name of the integrated document and the paragraph number. On the other hand, in "specify keyword" (1506, 1508), the paragraph including the keyword instructed by the user is specified as the paragraph to be replaced. FIG. 15B shows an example of the input screen displayed in the case that "specify paragraph No." (1502 or 1504) is pressed. Also, 15C shows an example of the input screen displayed in the case that "specify keyword" (1506, 1508) is pressed.

Returning to the description of the flowchart in FIG. 13. In step S1302, the editing disabling information in the metadata or document header is confirmed, and in the case the editing is disabled (NO in step S1302), the flow in the present flowchart is ended. If there is no editing disabling information, loop processing is repeatedly performed between L1300 and L1310 for all of the editing processing specified with the editing instructions for the integrated document specified in step S1301.

In step S1303, a search is performed as to whether the same text string as the text string before the replacement specified in step S1301 exists within the "editing keyword" included in the metadata in the integrated document. As a result of the search in step S1303, if the text string is not in the "editing keyword" (No in step S1304), the flow is advanced to step S1305, and the text string before replacement is searched from the objects in the integrated document. For example, if the object in the integrated document is "TEXT" attribute, a search for the text string before replacement is performed as to the entire object. An OCR processing may also be performed here as needed. The reason for searching the image after rendering printing data with OCR is to recognize the text strings stored separately in the vector data while being continuous text strings.

Upon a text string to replace being found, the flow is advanced to step S1306, and editing processing such as replacing with the replacement text string specified in step S1301 and so forth is performed.

On the other hand, as a result of the search in step S1303, in the case that the text string exists in "editing keyword" (Yes in step S1304), the flow is advanced to step S1306. In step S1306, editing processing is performed such as replacing the text string in the object specified with the editing keyword with the replacement text string specified in step S1301 and so forth. Note that as with the processing in step S1303, specifying the text string to be edited in the object based on the editing keyword enables specifying the text string at a higher speed than searching the text string from the entire object. The editing processing performed in step S1306 may be performed in the case of editing in increments of text strings, or may be performed in the case of editing in increments of paragraphs.

If the editing processing performed in step S1306 is editing in increments of paragraphs (Yes in step S1307), the flow is advanced to step S1308, the object in the integrated document is divided, and a storage block for only the editing portion is generated.

The flow is advanced to step S1309, and metadata as to each of the divided objects is generated again.

The flow is then advanced to step S1310, the text string in the paragraph edited in step S1306 is extracted, and the editing search keyword is generated.

The flow is then advanced to step S1311, and the history of editing performed in step S1306 within the regenerated metadata is extracted. The flow is advanced to step S1312, and the editing search keyword generated in step S1310 is stored in the regenerated metadata.

On the other hand, if editing is in increments of text strings (No in step S1307 and Yes in step S1313), the flow is advanced to step S1314, and the editing history of editing performed in step S1306 is extracted from the metadata. The flow is advanced to step S1315, and the text string edited in step S1306 is extracted, and an editing search keyword is generated.

The flow is advanced to step S1316, and the editing history extracted in step S1314 and the editing keyword extracted in step S1315 are saved as metadata of the object subjected to editing.

Upon all of the editing processing ending, the flow is advanced to step S1317, and a list of keywords with a high-hit-rate for search included in the user information within the editing information databases according to user is updated based on the editing keywords used this time and the hit rates thereof.

FIG. 16 is a diagram showing how the object and metadata change with the editing processing shown in FIGS. 15A through 15C. In FIG. 16, editing of paragraphs and words in the "TEXT" object in the integrated document is performed. With the "TEXT" object 1602 before editing, the first paragraph 1604 is subject to replacement, and the text string called "figure" in the second paragraph 1606 is subject to replacement. The metadata 1608 is metadata corresponding to the object before editing.

A post-editing object 1610 is an object after replacing the first paragraph 1604 with the text of another paragraph. A post-editing object 1614 is another object wherein the text string "figure" in the second paragraph 1606 is replaced with the text string "Fig." With the present embodiment, in the case that editing is performed in increments of paragraphs, an object divided into paragraphs subjected to editing is generated. The processing in step S1308 of the flowchart in FIG. 13 is performed, whereby the object is thus divided.

In accordance with pre-editing object 1602 being divided into post-editing objects 1610 and 1614, the corresponding metadata 1612 and 1616 are also regenerated corresponding to the post-editing object.

The editing keyword extracted in step S1310 is stored as an editing keyword of the metadata 1612 in step S1312. The editing keyword extracted in step S1315 is stored as the editing keyword in the metadata 1616 in step S1316.

The editing history extracted in step S1311 is saved as editing history of the metadata 1612 in step S1312. The editing history extracted in step S1314 is stored as editing history of the metadata 1616 in step S1316.

Figure 17:
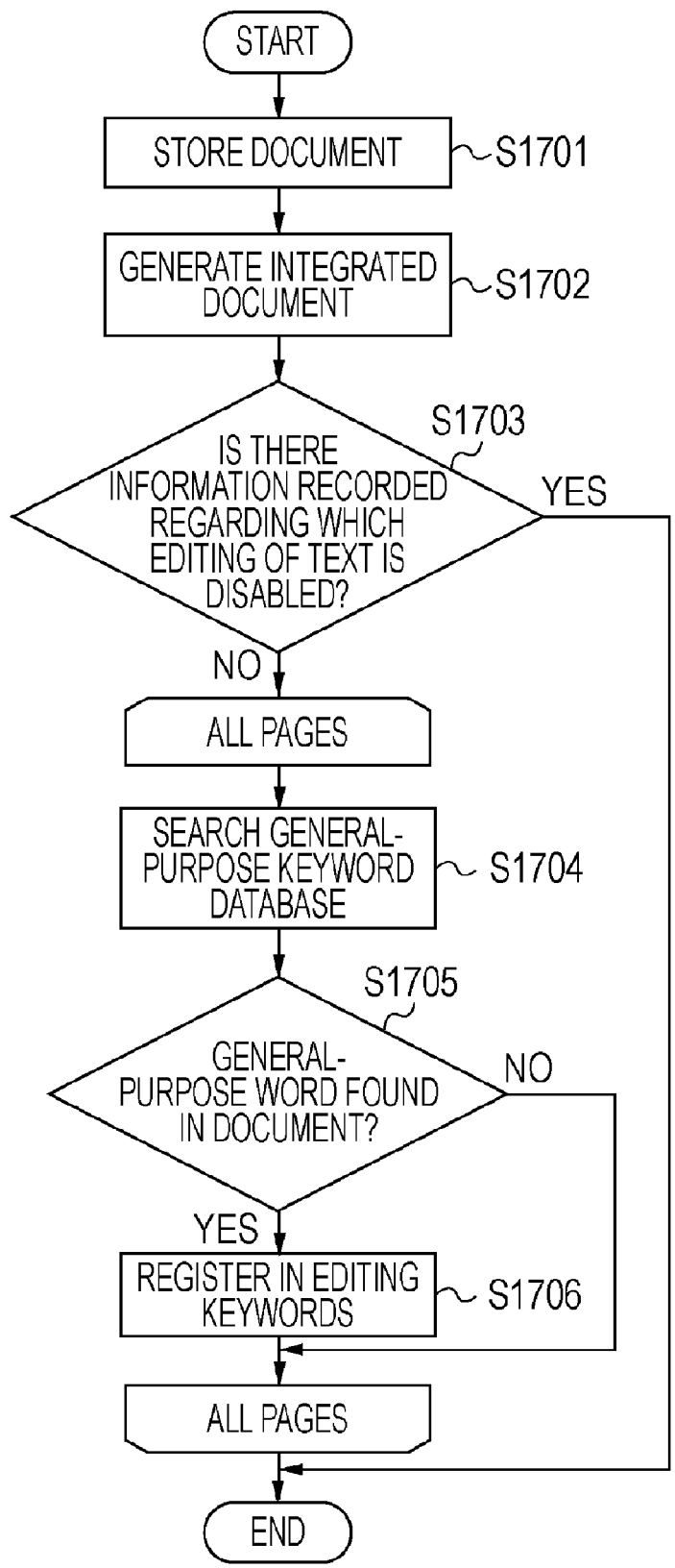
FIG. 17 is a flowchart illustrating an example of editing keyword registration processing according to an embodiment of the present invention.

FIG. 17 is a flowchart showing an example of editing keyword registration processing with the image processing apparatus according to the present embodiment. The present flowchart is executed with the CPU 202 of the MFP 100.

First, in step S1701, text data which is not the integrated document is stored in the HDD 210 of the MFP 100. This text data is equivalent to the image data obtained by scanning a document or a PDL or text data received externally.

Next, in step S1702, the text data is converted with the control unit 201 and an integrated document is generated. The conversion and generating processing is equivalent to the processing described in FIGS. 7 and 8. In the case that information indicating editing disabling is added to the text data before conversion, or in the case that the user has specified editing disabling, data is stored in the editing disabling information storage region of the document header and metadata to indicate disabling.

Next the flow is advanced to step S1703, and if information for editing disabling is in the generated metadata, the flow of the present flowchart is ended without performing the editing keyword creation processing. On the other hand, if there is no editing disabling information (No in step S1703), processing of the flow from step S1704 through S1706 is executed as to all of the pages of the integrated document. In step S1704, a general-purpose keyword database is referenced wherein words likely to be subject to editing and keywords relating to the drawing object are registered beforehand, and a search is performed as to whether the keywords registered in the general-purpose keyword database are included in the integrated document.

Figure 18:
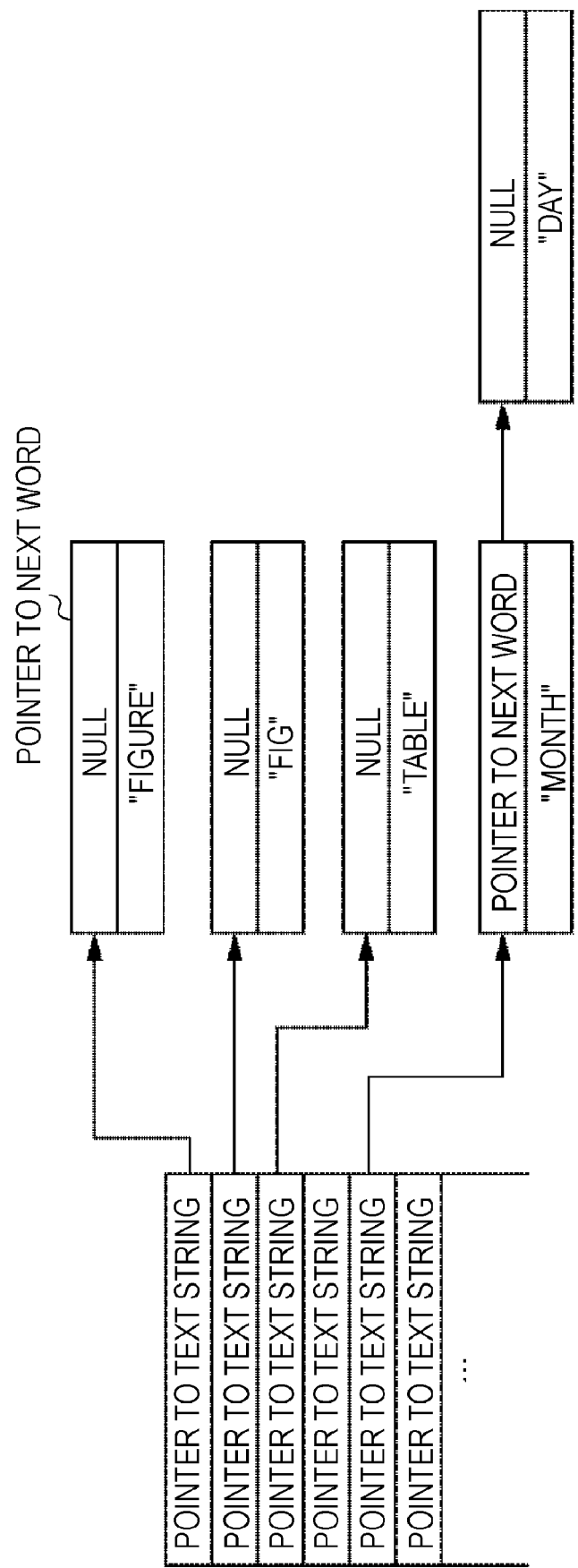
FIG. 18 is a diagram illustrating an example of a general-purpose keyword database according to an embodiment of the present invention.

FIG. 18 shows an example of a general-purpose keyword database according to the present embodiment. The general-purpose keyword database is configured in one of the HDD 210, ROM 206, and RAM 207 on the control unit 201. The general-purpose keyword database is made up of a pointer to manage the text string of the keywords and the text strings of the keywords. In the case that combined text strings serve as a keyword, such as in the case of "month" and "date" in a statement of "Month: so-and-so, date: so-and-so", the "month" and "date" are stored separately and linked by a pointer.

As a result of the search in step S1704, if there is an object with a keyword in the integrated document which is registered in the general-purpose keyword database (Yes in step S1705), the flow is advanced to step S1706. In step S1706, the matched keyword is stored in the editing keyword storage region of the metadata corresponding to the object. On the other hand, as a result of the search in step S1704, if there is no object with a keyword in the integrated document that is registered in the general-purpose keyword database, the processing in steps S1704 through S1706 is performed as to the object in the next page.

Upon executing the processing in steps S1704 through S1706 to all pages, the flow of the present flowchart is ended. An arrangement may be made wherein the flow of the flowchart in FIG. 17 is executed in the processing generating the integrated document, e.g. the steps S705, S709, S7121 in the flowchart in FIG. 7 and step S808 in the flowchart in FIG. 8.

By executing the flow in the flowcharts in FIG. 13 or 17, the keywords likely to be used with the editing processing can be stored beforehand as metadata in the integrated document. Accordingly, all of the keywords in the integrated document are not stored in the metadata, but rather the keywords likely to be used with the editing processing can be stored in the metadata, whereby the metadata can be efficiently configured.

Figure 19:
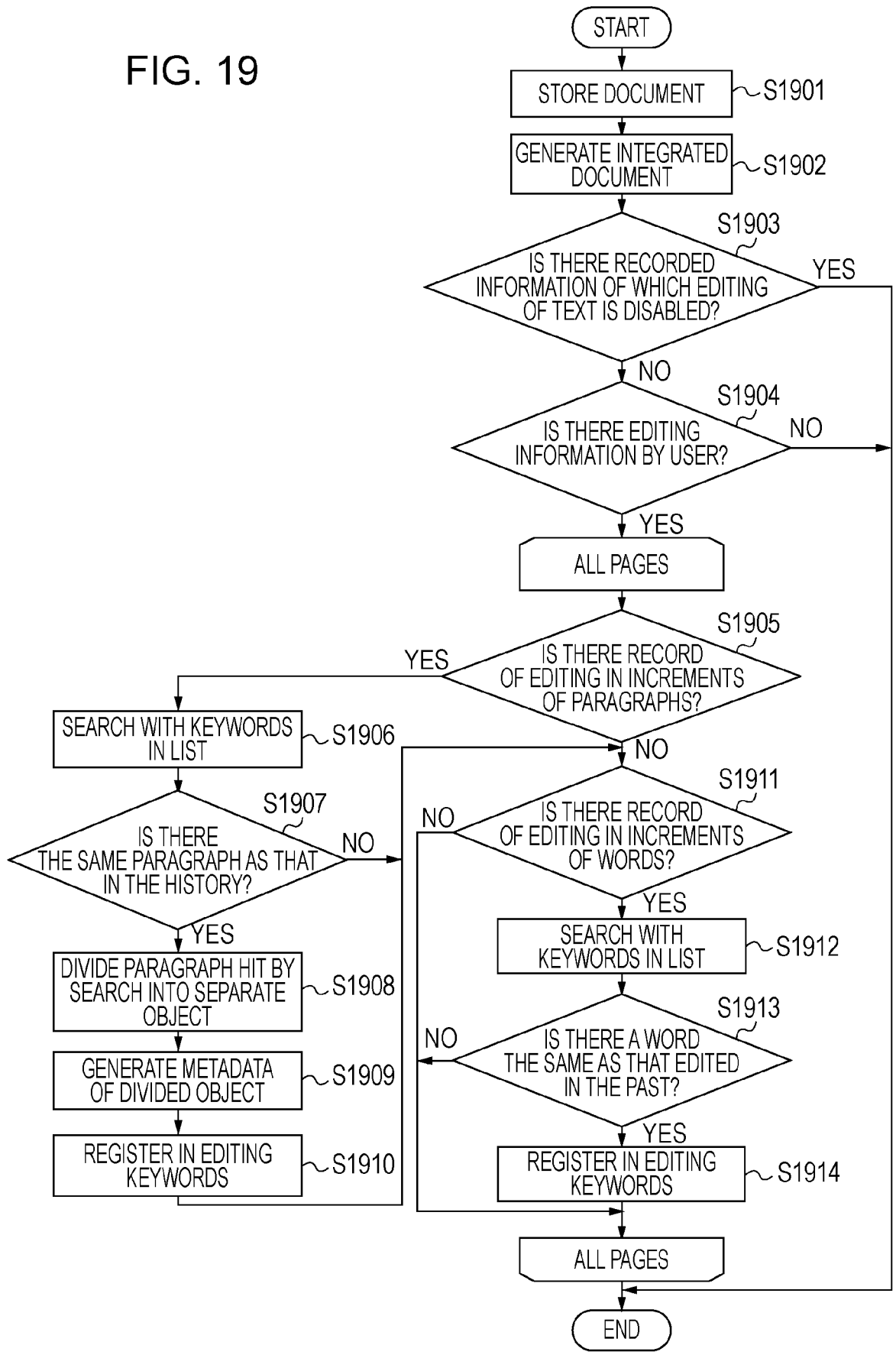
FIG. 19 is a flowchart illustrating another example of editing keyword registration processing according to an embodiment of the present invention.

FIG. 19 is a flowchart showing another example of editing keyword registration processing with the image processing apparatus according to the present embodiment. The flow in the present flowchart is executed with the CPU 202 of the MFP 100. The MFP 100 can execute the flow in the flowchart in FIG. 17, and may also execute the flow in the flowchart in FIG. 19.

First, in step S1901, text data which is not the integrated document is stored in the HDD 210 of the MFP 100. The text data is equivalent to the image data obtained by scanning a document or PDL received externally.

In step S1902, the text data is converted to generate an integrated document. The generating processing for the integrated document uses the methods shown in FIG. 7 or FIG. 8. In the case that information indicating editing disabling of the text data has been appended before conversion, or in the case that the user has specified editing disabling, data indicating disabling is stored in the editing disabling information storage region of the document header and metadata.

The flow is advanced to step S1903, and if there is editing disabling information in the generated metadata (YES in step S1903), the flow in the present flowchart is ended without performing editing keyword creation processing.

On the other hand, if editing is not disabled (No in step S1903), the text data is searched in step S1901 as to whether the user information stored in the HDD 210 is registered in the editing information database 1218 (FIG. 12). If there is no user information in the editing information database 1218 (No in step S1904), the flow in the present flowchart is ended.

FIG. 20 shows an example of the editing information database sorted according to user according to the present embodiment. FIG. 20 shows a state wherein the editing historical information according to user is stored in the editing information database 1218. An editing history 1 (2002) and editing history 2 (2010) and continuing multiple editing histories are stored in the editing information database 1218, corresponding to identification information according to user (user ID). Editing content 2004, editing keyword 2006 used therefore, and keyword 2008 generated after editing are stored in each editing history.

Returning to the description in FIG. 19. In the case that user information exists in the editing information database 1218 wherein text data is stored in the HDD 201 in step S1901, the processing in steps S1905 through S1914 are repeatedly processed as to all of the pages within the integrated document. On the other hand, in the case that user information does not exist in the editing information database 1218 wherein text data is stored in the HDD 210 in step S1901 (No in step S1904), the flow in the present flowchart is ended.

In step S1905, a search is performed as to whether there is a record relating to editing in paragraph increments as the editing history in the user editing information in the editing information database 1218. If there is an editing record in paragraph increments, the flow is advanced to step S1906, and if not, the flow is advanced to step S1911. In step S1905, a search is performed as to whether a paragraph which is the same as the paragraph edited therein is in the integrated document generated in step S1902. The search is performed by comparing the editing keyword in paragraph increments stored in the editing information database 1218 and the keyword included in the metadata of the integrated document. Alternatively, the search is performed by comparing the editing keyword in increments of paragraphs stored in the editing information database 1218 with the text string in the "TEXT" object in the integrated document.

If there is an object including the same as a paragraph which had been edited in the past (Yes in step S1907), the flow is advanced to step S1908, and if not, the flow is advanced to step S1911. In step S1908, the paragraph is divided out from the object as an independent object of the vector data. In step S1909, metadata of the object divided out in step S1908 is generated. The flow is advanced to step S1910, the keyword used for the search in step S1906 is removed from the editing information database 1218, and registered in the storage region of the editing keyword of the metadata as to the divided object.

In step S1911, a search is performed as to whether there is any editing record in increments of words in the editing information of the user within the editing information database 1218. The search is performed by comparing the editing keyword in increments of words stored in the editing information database 1218 and the keywords included in the metadata in the integrated document. Alternatively, the search is performed by comparing the editing keyword in increments of words stored in the editing information database 1218 and the text string within the "TEXT" object in the integrated document. If there is any editing record (Yes in step S1905), a search is performed as to whether the applicable word is included in the integrated document.

If there is a word which is the same as a word edited in the past (Yes in step S1913), the flow is advanced to step S1914, and if not, the flow is advanced to the processing of the next page. In step S1914, the word is registered as an editing keyword in the metadata of the object including such word hit upon in the search. In the event that a new integrated document is generated by executing the flowchart in FIG. 19, the keyword used by the user who has generated the integrated document to perform editing in the past can be registered as metadata of the integrated document. Accordingly, at the point in time that the integrated document which has not been edited is newly generated, the keywords likely to be used at the time of editing can be included in the metadata, enabling the metadata of the integrated document to be efficiently registered.

Figure 21:
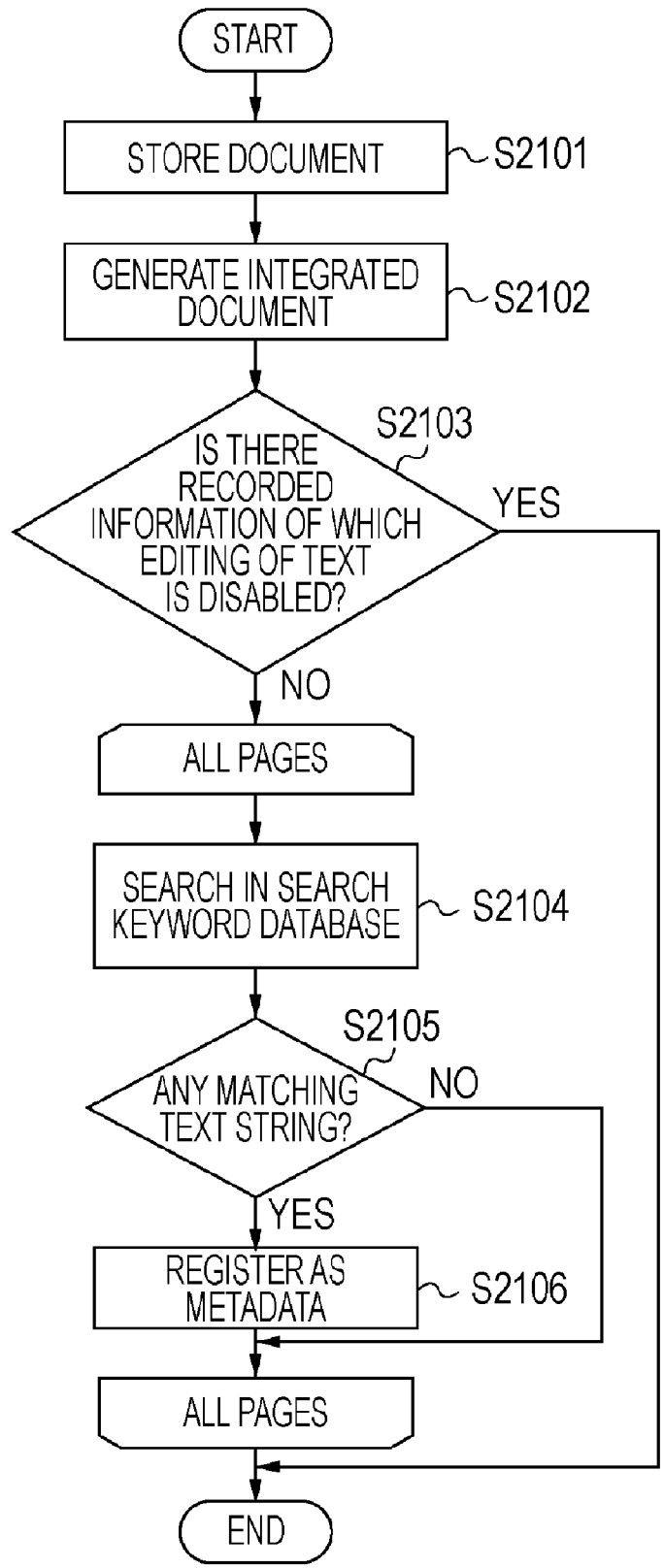
FIG. 21 is a flowchart to describe an example of search keyword registration processing according to an embodiment of the present invention.

FIG. 21 is a flowchart describing an example of the search keyword registration processing with the image processing apparatus according to the present embodiment. The flow in the present flowchart is executed with the CPU 202 of the MFP 100. The MFP 100 can execute the flow of the flowcharts in FIGS. 17 and 19, and may be able to execute the flow in the flowchart in FIG. 21.

As a premise to execute the flow in the flowchart in FIG. 21, a search keyword database is configured in the HDD 210 of the MFP 100. The search keyword database is a database similar to the editing information database 1218 (FIG. 12), and is a database which collects a search history as to the integrated document, and is a database storing keywords which are likely to be used for searches.

First, in step S2101, the text data which is not an integrated document is stored in the HDD 210 of the MFP 100. The text data is equivalent to image data obtained by scanning a document or a PDL received externally.

In step S2102, the text data is converted to generate an integrated document. The generating processing of the integrated document uses the methods shown in FIG. 7 or FIG. 8. In the case that information indicating editing disabling is added to the text data before conversion, or in the case that the use has specified editing disabling, data indicating disabling of the editing disabling information storage region in the document header and metadata is stored.

The flow is advanced to step S2103, and if there is editing disabling information in the generated metadata (YES in step S2103), the flow in the present flowchart is ended without performing editing keyword creation processing. On the other hand, if editing is not disabled (No in step S2103), the steps S2104 through S2106 are repeatedly executed as to all of the pages in the integrated document.

In step S2104, a search is performed as to whether any text string extracted from the text data matches a text string registered in the search keyword database. If there is a match (Yes in step S2105), the text string thereof is registered as metadata of the integrated document (step S2106).

Thus, rather than registering all of the text strings extracted from the text data as metadata, the text string with a high probability of being used for searching using the search keyword database is registered as metadata. Thus, the metadata in the integrated document can be prevented from becoming overly expansive.

Figure 22:
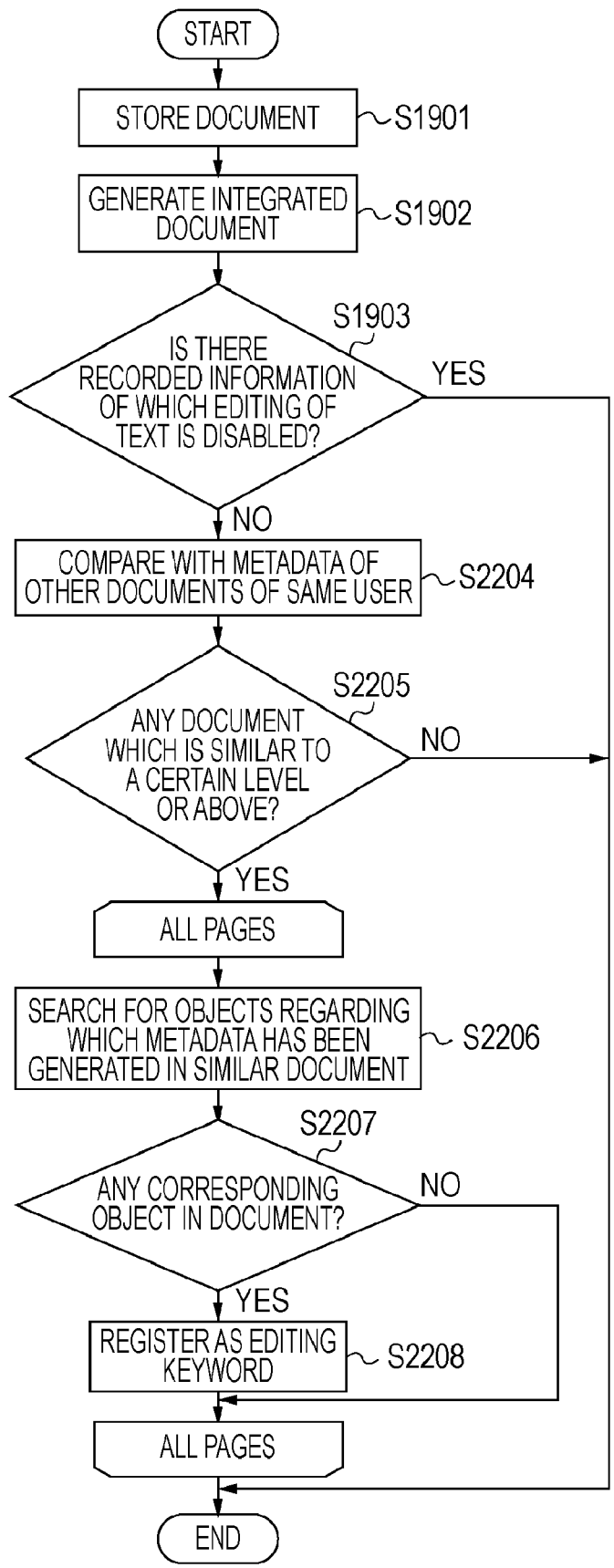
FIG. 22 is a flowchart illustrating yet another example of editing keyword registration processing.

FIG. 22 is a flowchart showing yet another example of editing keyword registration processing with the image processing apparatus according to the present embodiment. The flow in the present flowchart is executed by the CPU 202 of the MFP 100. Note that an arrangement may be made wherein the MFP 100 can execute the flows in the flowcharts in FIGS. 17 and 19, and may also execute the flow in the flowchart in FIG. 22.

Steps S1901 through S1903 are the same processing as the steps S1901 through S1903 in FIG. 19 so the description thereof will be omitted.

In step S2204, comparison is made between the metadata of the integrated document generated in step S1902 and the metadata of another integrated document of which the same user instructs generation, which is already stored in the HDD 210. The metadata are compared with one another, a determination is made as to whether the metadata is similar based on the number of keywords shared by both.

If there is no integrated document having similar metadata (No in step S2205), the flow in the present flowchart is ended. On the other hand, if there is an integrated document having similar metadata (Yes in step S2205), the processing in the steps S2206 through S2208 are repeatedly performed as to all of the pages in the integrated document.

In step S2206, an object is specified which corresponds to the metadata of the integrated document having similar metadata. The flow is then advanced to step S2207, and determination is made as to whether an object similar to this object is included in the integrated document generated in step S1902.

If not included (No in step S2207), the flow is advanced to the processing for the next page, and if included (Yes in step S2207), the editing keyword of the similar metadata is stored as the editing keyword of the metadata corresponding to the object.

According to the flowchart in FIG. 22, if there is a document similar to the newly generated integrated document, an editing keyword in the metadata of the similar document can be registered as the metadata of the newly generated integrated document. Thus, the metadata of the newly generated integrated document can be efficiently registered.

Modified Example of Replacement Operation

With the above-described embodiment, as shown in FIGS. 14 and 15, an operation example is illustrated wherein character input is performed using the operation panel 121 as an operation in the case of performing replacement of a text string in the integrated document. Another operating example is shown in FIG. 23.

Figure 23:
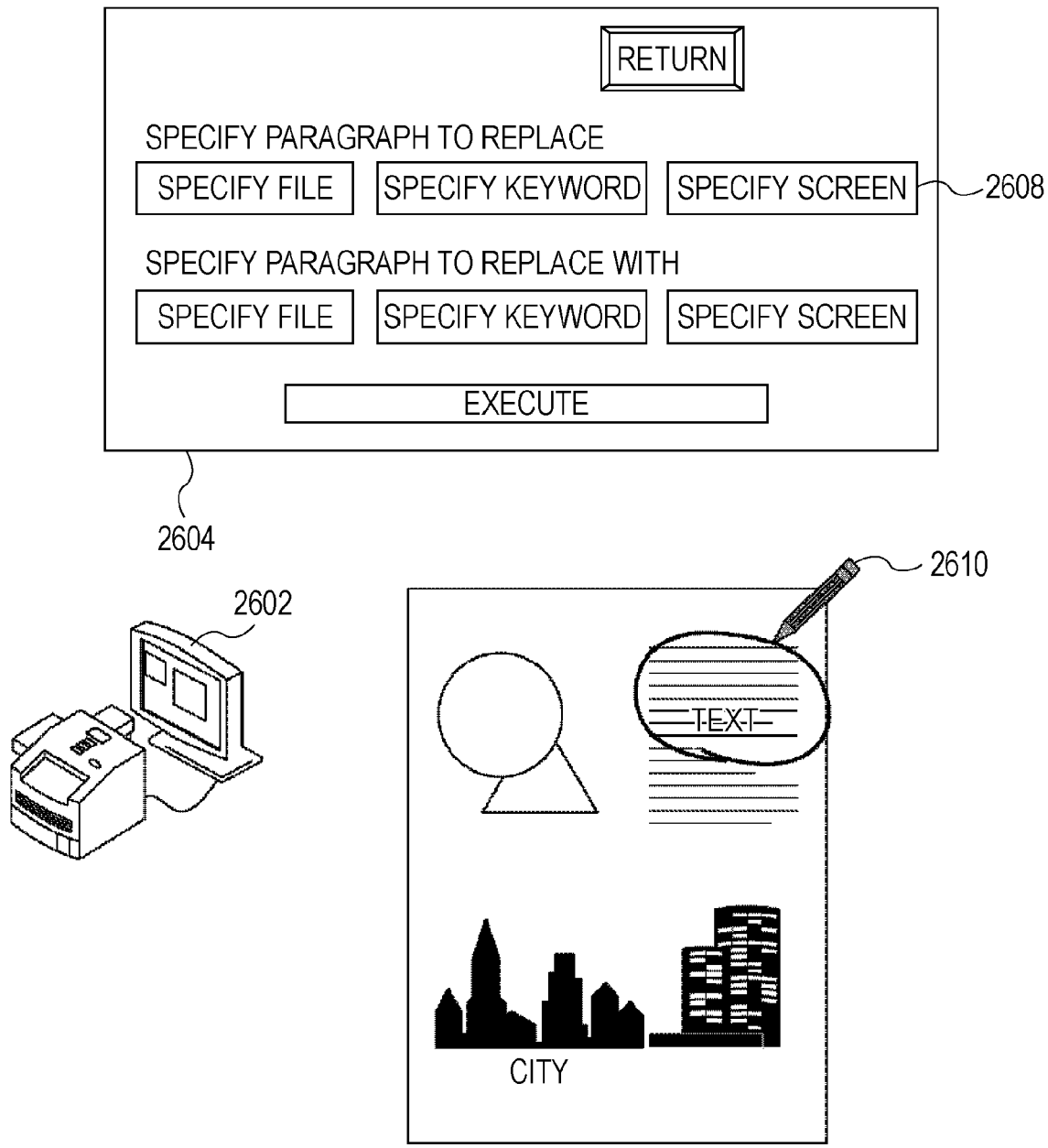
FIG. 23 is a diagram illustrating an operation example using a touch panel instead of the operating panel 121.

FIG. 23 is a diagram illustrating an operating example using a touch panel instead of the operating panel 121 in the operating examples in FIGS. 14 and 15. Upon a user pressing an image specifying button 2608 in a window 2604 displayed on the touch panel 2602, an integrated document in the HDD 210 or an integrated document generated based on image data read from the scanner unit 122 is displayed. A user can use a touch pen 2610 to specifying the portion to perform replacement, whereby operations for replacement of the integrated document can be performed.

Also, if the image processing apparatus is audio input capable, audio input may be performed instead of the text input to the panel shown in FIGS. 14 and 15.

Database Sharing

Next, processing for sharing the database for editing keywords and so forth between multiple MFPs via a network will be described. With the above-described embodiment, the integrated document is stored in the HDD 210 of the MFP 100. However, with an image processing system wherein multiple MFPs are connected via the network, an HDD is provided on each image processing apparatus. The integrated document belonging to a certain user may be dispersed among multiple MFP HDDs and stored therein.

Figure 24:
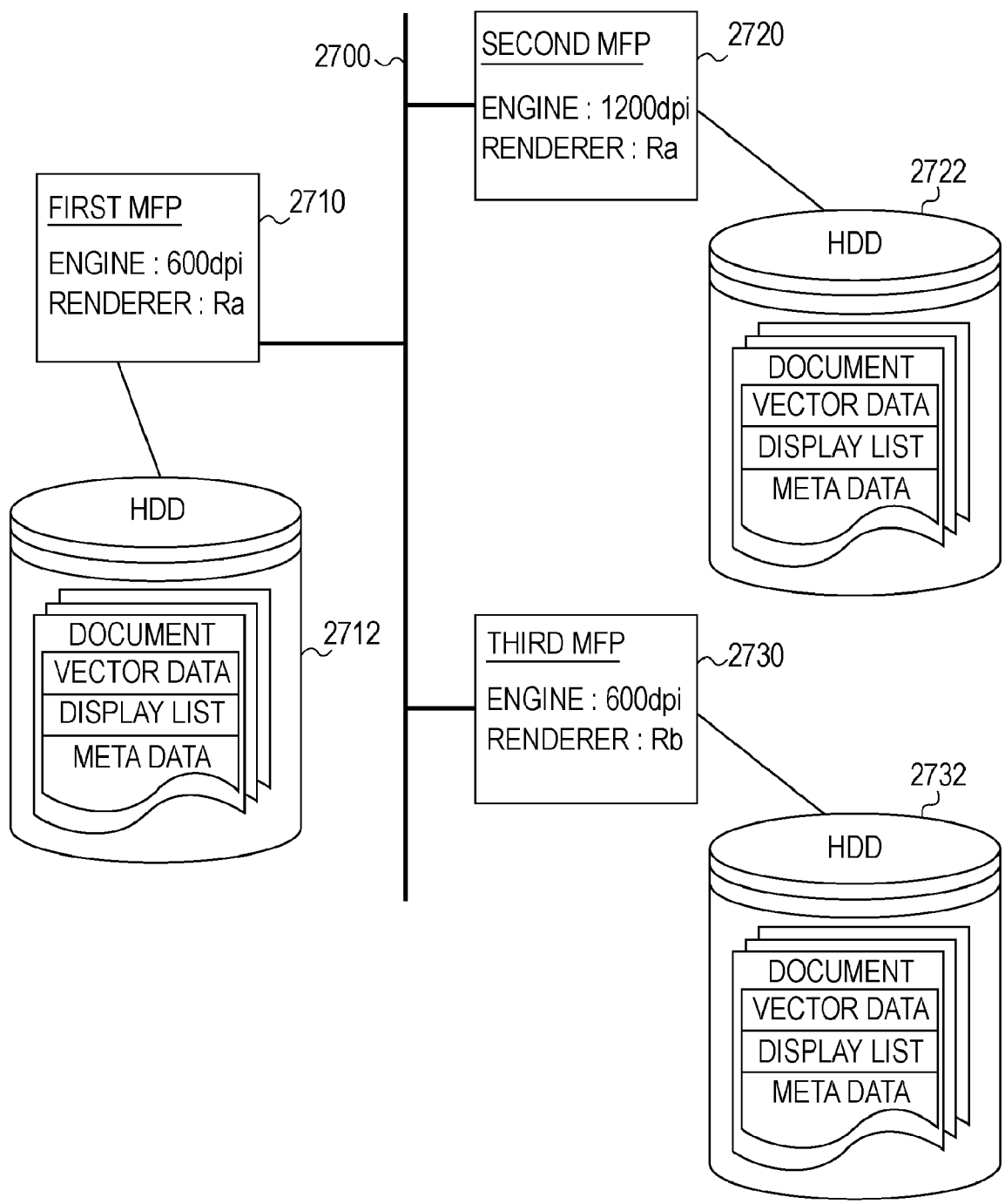
FIG. 24 is a diagram illustrating an example a configuration wherein multiple MFPs are connected via a network, according to an embodiment of the present invention.

FIG. 24 shows an example of an image processing system wherein multiple MFPs are connected via a network. In FIG. 24, the image processing system is made up of a first MFP 2710, second MFP 2720, and third MFP 2730 which are mutually connected via a LAN (Local Area Network) 2700 or the like.

Each MFP has HDDs (Hard Disk Drive (a secondary storage device)) 2712, 2722, and 2732. Data such as an integrated document is stored in each of the HDD 2712, 2722, and 2732. Each MFP can mutually communicate using a predetermined network protocol. Note that these MFPs which are connected on the LAN 2700 do not need to be limited to the physical position as shown in FIG. 24. Also, devices other than an MFP (e.g. PC, various types of servers, printers, and so forth) may be connected to the LAN 2700. With the system in FIG. 24, e.g., the metadata of the integrated document edited with the first MFP 2710 is sent to another MFP (2720, 2730), and the other MFP (2720, 2730) stores the received metadata in the respective HDD (2722, 2732). Thus, a database for editing keywords or editing history can be shared between each of the MFPs.

Figure 25A:
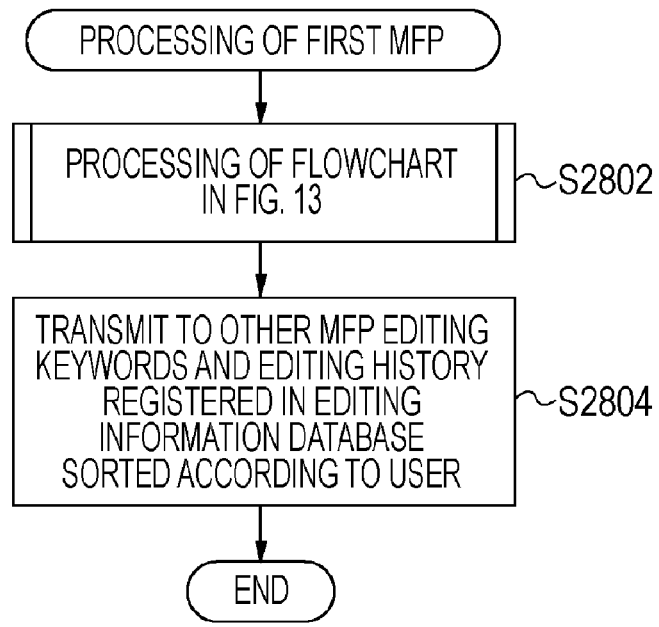
FIG. 25 is a flowchart to describe metadata shared processing according to an embodiment of the present invention.
Figure 25B:
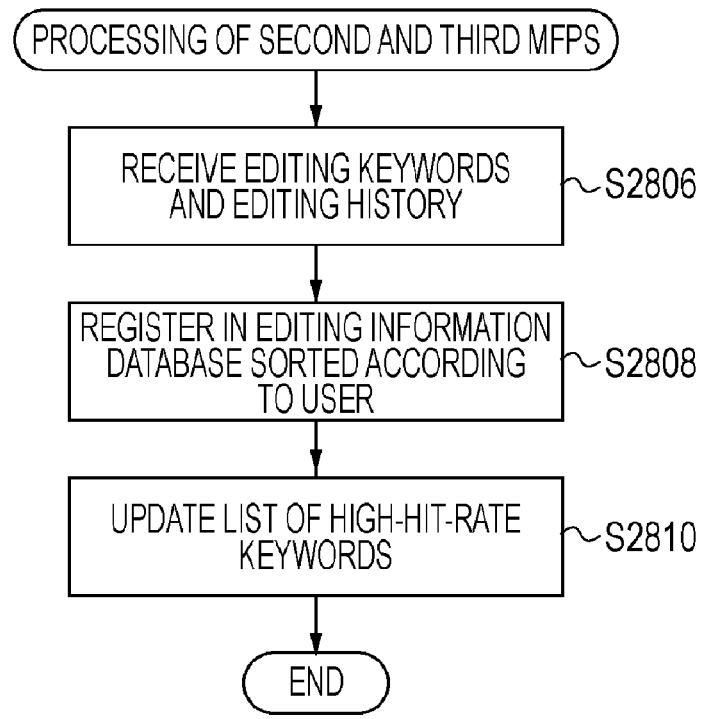

FIG. 25 is a flowchart describing the sharing processing of metadata according to the present embodiment. As an example, a case will be described wherein the integrated document is edited with the first MFP 2710, and the metadata thereof is send to the second MFP 2720 and third MFP 2730. The flowchart in FIG. 25A is a flowchart wherein the flow is executed by the first MFP 2710, and the flowchart in FIG. 25B is a flowchart wherein the flows are each executed by the second MFP 2720 and third MFP 2730. First, the first MFP 2710 executes the flow of the integrated document editing processing shown in FIG. 13 (S2802).

In step S2804, the editing history and editing keywords registered in the editing information database sorted according to user in the HDD 210 of the first MFP 2710 are sent to another MFP (2720, 2730), and the flow in the flowchart is ended. This is the processing of the first MFP 2710.

On the other hand, in step S2806, the second and third MFPs (2720, 2730) receive the editing history and editing keywords from the first MFP 2710.

In step S2808, the editing content of the editing history and editing keywords received in step S2806 are stored in the editing information database sorted according to user in the HDD 210 of each MFP.

In step S2810, a list of keywords with a high-hit-rate is updated based on the newly registered editing keywords. The flow in the present flowchart is ended.

Modified Example of Editing Keyword Registration Processing

In the flowchart in FIG. 22, in the case that an integrated document is generated, the metadata of a similar document stored in the HDD 210 of the same MFP is registered as metadata of the generated integrated document. However, the similar document may be a document stored in another MFP connected to the network.

FIG. 26 is a flowchart of a modified example of the editing keyword registration processing. An example will be described here of a case wherein the first MFP newly generates an integrated document and the metadata of the generated document is registered in the system in FIG. 24. FIG. 26A shows processing executed by the first MFP 2710 and FIG. 26B shows processing executed by each of the second and third MFP (2720, 2730).

First, in step S2902, the integrated document is generated with the first MFP 2710, and the generated integrated document is stored in the HDD 210 of the first MFP 2710. In step S2904, a check is performed as to whether information showing editing disabling has been added to the metadata in the generated integrated document. As a result of the check, in the case that information showing editing disabling has been added (Yes in step S2904), the flow in the present flowchart is ended, and if not (No in step S2904), the flow is advanced to step S2906. In step S2906, the first MFP 2710 sends the metadata to the second and third MFP, and requests a search of similar integrated documents.

In step S2908, comparison is made between the metadata of the integrated document generated in step S2902 and the metadata of another integrated document of which the same user has instructed generation, which is already stored in the HDD 210.

Further, in step S2910, as a response to the metadata sent in step S2906, the search results from the second MFP 2720 or the third MFP 2730 are received. If there is a similar integrated document as a search result, the metadata thereof is received.

In step S2912, determination is made as to whether there is an integrated document having similar metadata from the comparison results in step S2908 and the metadata received in step S2910. If there is (Yes in step S2912), the processing in steps S2914 through S2918 are repeatedly executed as to all of the pages of the similar integrated document. On the other hand, if there is no integrated document having similar metadata (NO in step S2912), the flow in the present flowchart is ended.

In step S2914, an object is specified which corresponds to the metadata of the integrated document having similar metadata. The flow is advanced to step S2916, and determination is made as to whether an object, which is the same as the above object, is included in the integrated document generated in step S2902.

If the object is not included (No in step S2916), the flow is advanced to the processing of the next page, and if the object is included (Yes in step S2916), and editing keywords of the similar metadata are stored as editing keywords in the metadata corresponding to the object.

FIG. 26B is a flowchart showing the processing with the second and third MFP (2720, 2730). This processing is executed by the CPU 202 in the second and third MFP (2720, 2730).

First, in step S2920, the metadata sent by the first MFP 2710 in step S2906 is received. Comparison is made in step S2922 between the metadata received and the metadata of another integrated document of which the same user has instructed generation, which is already stored in the HDD 210. If there is no integrated document having similar metadata (No in step S2924), the flow in the present flowchart is ended. On the other hand, if there is an integrated document having similar metadata (Yes in step S2924), the metadata of the integrated document thereof is sent to the first MFP 2710 in step S2926. The flow in the present flowchart is then ended. Note that various methods may be considered as methods to specify the similar integrated document. For example, the feature values obtained from each of the integrated documents are compared, the degree of similarity is computed, whereby determination may be made that the documents have a high degree of similarity if the degree of similarity is at or greater than a fixed degree of similarity.

By executing the flow in the flowchart in FIG. 26, a search for the integrated document similar to the generated integrated document can be performed as to an MFP other than the MFP which generated the integrated document. Thus, the probability of finding a similar integrated document is greater than with the processing in FIG. 22, enabling registration of the metadata in the integrated document more efficiently.

As described above, according to the present embodiment, keywords likely to be used for searches or keywords likely to be used in editing from the integrated document can be registered as metadata. Thus, the metadata of the generated integrated document can be efficiently generated, whereby the metadata of the integrated document can be prevented from becoming larger than necessary. Thus, a search as to the document can be performed efficiently.

Other Embodiment

While various embodiments have been described above, the present invention may be applied to a system configured from multiple devices, or may be applied to a stand-alone apparatus, e.g. scanner, printer, PC, photocopier, multifunction device, facsimile device, and so forth.

The present invention may be achieved by supplying a control program for realizing the various functions of the above-described embodiments directly or indirectly as to the system or device, and reading and executing the program code supplied by the computer included in the system.

Accordingly, in order to realize the functions/processing of the present invention with the computer or above-described devices, the program code of the control program installed in the computer or above-described devices also realize the present invention. That is to say, the control program itself for realizing the functions/processing is a part of the present invention.

In this case, if there is a program function, any program format may be used, such as object code, program executed with an interpreter, script data supplied to the OS (operating system), and so forth.

Examples of a recording medium to supply the program include magnetic disks such as floppy disks and hard disks, optical discs such as CD-ROM, CD-R, CD-RW, DVD (DVD-ROM, DVD-R), magneto-optical disks such MO, and other memory media such as magnetic tape, nonvolatile memory cards, ROM, and so on.

Also, the program may be downloaded from a website on the Internet or an intranet using a browser of the client computer. That is to say, the computer program itself of the present invention or files which are compressed and include an automatic install function may be downloaded to a recording medium such as a hard disk. Also, the present invention may be realized by the program code making up the program of the present invention being divided into multiple files, and various files downloaded from different websites. That is to say, there are cases wherein a WWW server to download the program file for realizing the function processing of the present invention as to multiple users also becomes a component of the present invention.

The program of the present invention may be encrypted, stored in a storage medium such as a CD-ROM and distributed to users. In this case, an arrangement may be made wherein only users having cleared predetermined conditions are permitted to download key information for decryption from a website via the Internet or intranet, the program decrypted with the key information is decoded and executed, and the program is installed on the computer.

Also, the functions of the above-described embodiments may be realized by a computer executing the read program. Note that based on the instructions of such program, the OS operating on the computer may perform a portion or all of the actual processing. Of course, in this case also, the functions of the above-described embodiments can be realized.

Further, the program read out from the recording medium may be written into memory provided to a function expansion board inserted in the computer, or to a function expansion unit connected to the computer. Based on the instructions of the program, the function expansion board or CPU attached to the function expansion unit may perform a portion or all of the actual processing. Thus, the functions of the above-described embodiments may be realized.

While the present invention has been described thus based on preferred embodiments, various modifications may be made within the scope of the claims, and are not restricted to the present embodiments.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-224093 filed Aug. 30, 2007, which is hereby incorporated by reference herein in its entirety.

What is claimed is:

1. An image processing apparatus comprising:
a vectorizing unit configured to convert bitmap image data into vectorized data;
an integrated document generating unit configured to generate an integrated document which includes the vectorized data and metadata;
an accompanying information extraction unit configured to extract one or more of accompanying information relating to the bitmap image data from the bitmap image data;
a registration unit configured to register the accompanying information that meets a predetermined condition out of the one or more of accompanying information extracted by the accompanying information extraction unit as the metadata of the integrated document, and not to register the accompanying information that does not meet the predetermined condition;
a similarity determining unit configured to determine the similarity between the integrated document generated by the integrated document generating unit and another integrated document; and
an accompanying information obtaining unit configured to obtain the accompanying information included in the metadata of the other integrated document which has a greater similarity than a fixed similarity with the integrated document,
wherein the registration unit registers the accompanying information that matches the accompanying information obtained by the accompanying information obtaining unit from the accompanying information extracted by the accompanying information extraction unit.

2. The image processing apparatus according to claim 1, further comprising:
a text recognition unit configured to perform text recognition processing to the bitmap image data,
wherein the accompanying information extraction unit extracts a text string obtained by the text recognition unit as the accompanying information.

3. The image processing apparatus according to claim 1, further comprising:
a feature information extraction unit configured to extract image feature information from the bitmap image data,
wherein the accompanying information extraction unit extracts the image feature information extracted by the feature information extraction unit as the accompanying information.

4. The image processing apparatus according to claim 1, further comprising:
a rendering unit configured to render and generate bitmap image data, and print the bitmap image data received externally,
wherein the vectorizing unit generates vectorized data based on the rendered bitmap image data,
and wherein the accompanying information extraction unit extracts the accompanying information from at least one of the bitmap image data subjected to rendering by the rendering unit and a text string included in the print data.

5. The image processing apparatus according to claim 1, wherein the registration unit registers information to be used to search for an integrated document as the accompanying information that meets the predetermined condition from the accompanying information extracted by the accompanying information extraction unit.

6. The image processing apparatus according to claim 1, wherein the registration unit registers information to be used to edit an integrated document, as the accompanying information.

7. The image processing apparatus according to claim 1, further comprising:
a database unit configured to store a text string as the metadata of an integrated document;
wherein the accompanying information extraction unit extracts the accompanying information from the bitmap image data as the text string;
and wherein the registration unit registers the text string from the accompanying information extracted by the accompanying information extraction unit that matches the text string stored in the database unit.

8. The image processing apparatus according to claim 1, wherein the accompanying information extraction unit extracts the accompanying information from the bitmap image data as a text string,
and wherein the registration unit registers a text string from the accompanying information extracted by the accompanying information extraction unit that matches the text string stored in the database unit that stores the text string to be the metadata of an integrated document, provided in an external database device of the image processing apparatus.

9. The image processing apparatus according to claim 7, further comprising:
an editing unit configured to edit an integrated document, wherein the database unit stores history of editing performed by the editing unit.

10. The image processing apparatus according to claim 1, wherein the accompanying information is information expressed as a text string,
and wherein the metadata is a group of a plurality of accompanying information registered by the registration unit, and further, is divided into a group of text strings used for searching of the integrated document and a group of text strings used for editing the integrated document.

11. A method for generating an integrated document, the method:
converting bitmap image data to vectorized data;
generating an integrated document which includes the vectorized data and metadata;
extracting one or more of accompanying information relating to the bitmap image data from the bitmap image data;
determining similarity between the generated integrated document and another integrated document;
obtaining the accompanying information included in the metadata of the other integrated document which has a greater similarity than a predetermined similarity with the integrated document; and
registering, as metadata of the integrated document, accompanying information that matches the accompanying information obtained from the other integrated document among the one or more of accompanying information extracted from the bitmap image data.

12. A non-transitory computer-readable storage medium, storing a program that, when executed by a computer, causes the computer to perform operations for generating an integrated document, the operations comprising:

converting bitmap image data to vectorized data;
generating an integrated document which includes the vectorized data and metadata;
extracting one or more of accompanying information relating to the bitmap image data from the bitmap image data;
determining similarity between the generated integrated document and another integrated document;
obtaining the accompanying information included in the metadata of the other integrated document which has a greater similarity than a predetermined similarity with the integrated document; and
registering, as metadata of the integrated document, accompanying information that matches the accompanying information obtained from the other integrated document among the one or more of accompanying information extracted from the bitmap image data.

* * * * *